US011900931B2

(12) United States Patent
Kawano et al.

(10) Patent No.: US 11,900,931 B2
(45) Date of Patent: Feb. 13, 2024

(54) INFORMATION PROCESSING APPARATUS AND INFORMATION PROCESSING METHOD

(71) Applicant: Sony Group Corporation, Tokyo (JP)

(72) Inventors: Shinichi Kawano, Tokyo (JP); Ryouhei Yasuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 400 days.

(21) Appl. No.: 17/292,003

(22) PCT Filed: Oct. 23, 2019

(86) PCT No.: PCT/JP2019/041578
§ 371 (c)(1),
(2) Date: May 7, 2021

(87) PCT Pub. No.: WO2020/105349
PCT Pub. Date: May 28, 2020

(65) Prior Publication Data
US 2022/0013117 A1    Jan. 13, 2022

(30) Foreign Application Priority Data
Nov. 20, 2018    (JP) .................................. 2018-217585

(51) Int. Cl.
*G10L 15/22*        (2006.01)
*G06F 3/0346*    (2013.01)
(Continued)

(52) U.S. Cl.
CPC .............. *G10L 15/22* (2013.01); *G06F 3/038* (2013.01); *G06F 3/0346* (2013.01); *G10L 15/24* (2013.01)

(58) Field of Classification Search
CPC ......... G10L 15/22; G10L 15/24; G10L 15/26; G10L 15/18; G10L 17/22; G10L 25/63;
(Continued)

(56) References Cited

U.S. PATENT DOCUMENTS

| 7,013,258 B1 | 3/2006 | Su et al. | |
| 2015/0019227 A1* | 1/2015 | Anandarajah | G10L 15/18 |
| | | | 704/257 |
| 2019/0339772 A1* | 11/2019 | Yoshida | G06F 3/013 |

FOREIGN PATENT DOCUMENTS

| EP | 3 062 237 A1 | 8/2016 |
| JP | 6-51901 A | 2/1994 |

(Continued)

OTHER PUBLICATIONS

International Search Report and Written Opinion dated Dec. 3, 2019, received for PCT Application PCT/JP2019/041578, Filed on Oct. 23, 2019, 10 pages including English Translation.

*Primary Examiner* — Yogeshkumar Patel
(74) *Attorney, Agent, or Firm* — XSENSUS LLP

(57) ABSTRACT

An information processing apparatus that includes a deciding unit that decides character representation related to speech-to-text conversion of a verbal action performed by a user is provided. The deciding unit decides the character representation for each detected verbal action section based on a detected non-verbal action of the user. Furthermore, an information processing method that causes a processor to execute a process for deciding character representation related to speech-to-text conversion of a verbal action performed by the user is provided. The process further includes a process for deciding the character representation for each detected verbal action section based on a detected non-verbal action performed by the user.

19 Claims, 32 Drawing Sheets

(51) Int. Cl.
*G06F 3/038* (2013.01)
*G10L 15/24* (2013.01)

(58) Field of Classification Search
CPC ........ G06F 3/012; G06F 3/0346; G06F 3/038;
G06F 3/167; G06F 3/013; G06F 3/017;
G06F 2203/0381; G06F 2203/011
See application file for complete search history.

(56) References Cited

FOREIGN PATENT DOCUMENTS

| | | |
|---|---|---|
| JP | 10-260773 A | 9/1998 |
| JP | 2004-110845 A | 4/2004 |
| JP | 2017-182500 A | 10/2017 |
| JP | 2017-536600 A | 12/2017 |
| WO | 2018/135064 A1 | 7/2018 |
| WO | WO-2018135064 A1 * | 7/2018 ............. A61B 3/113 |

* cited by examiner

FIG.5
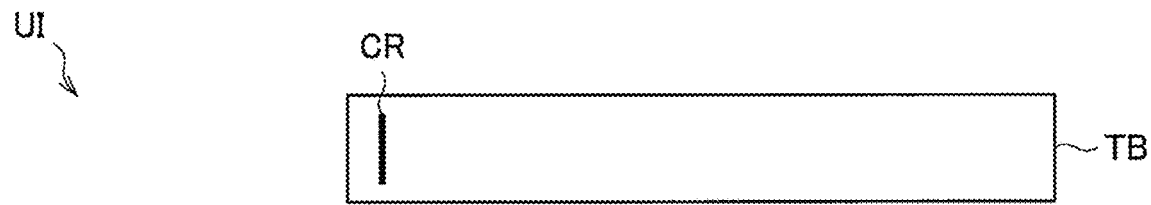
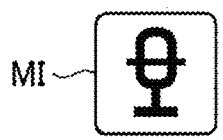
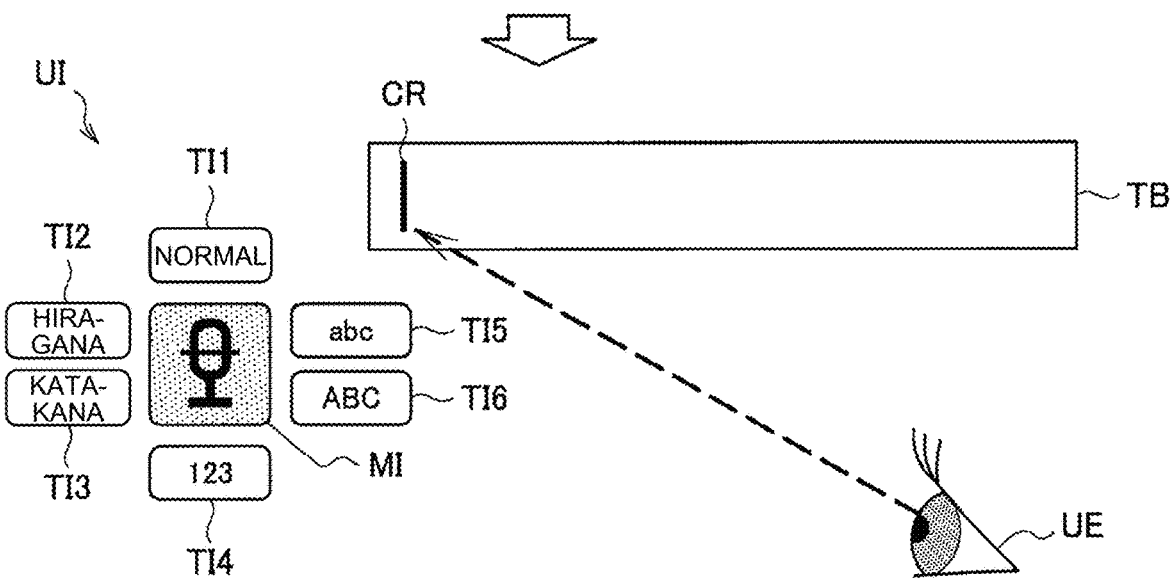
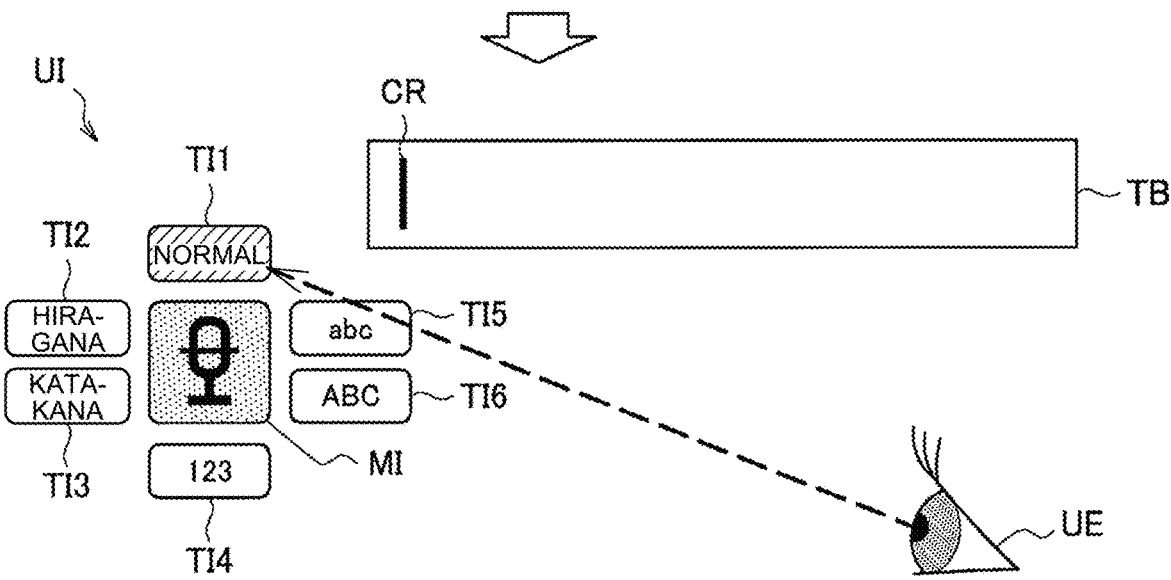

FIG.6
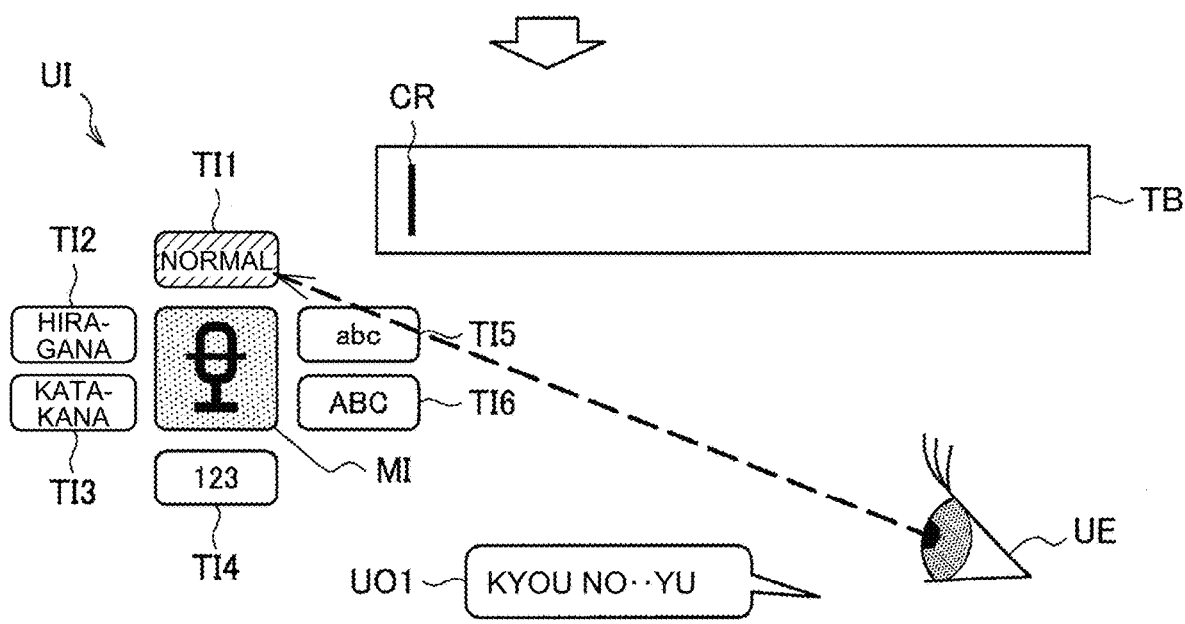
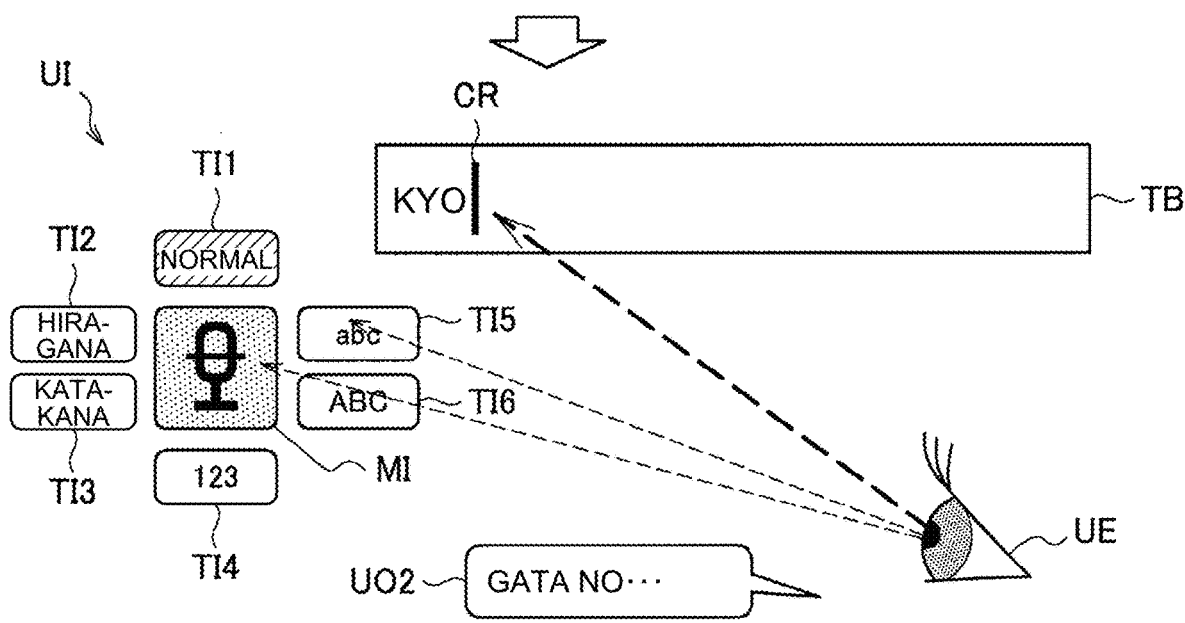

FIG.7
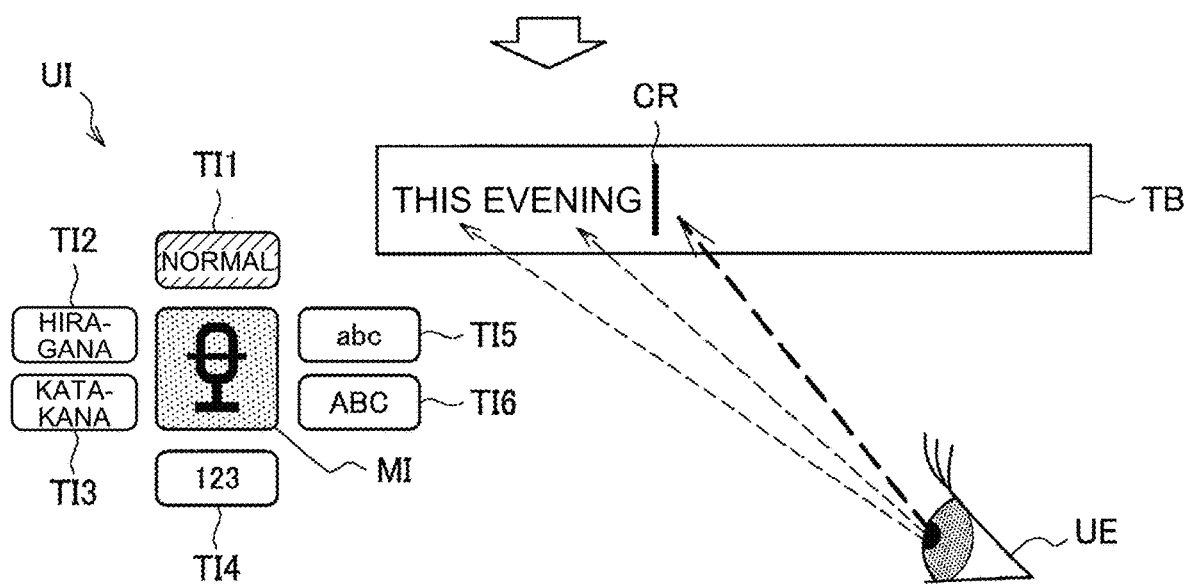
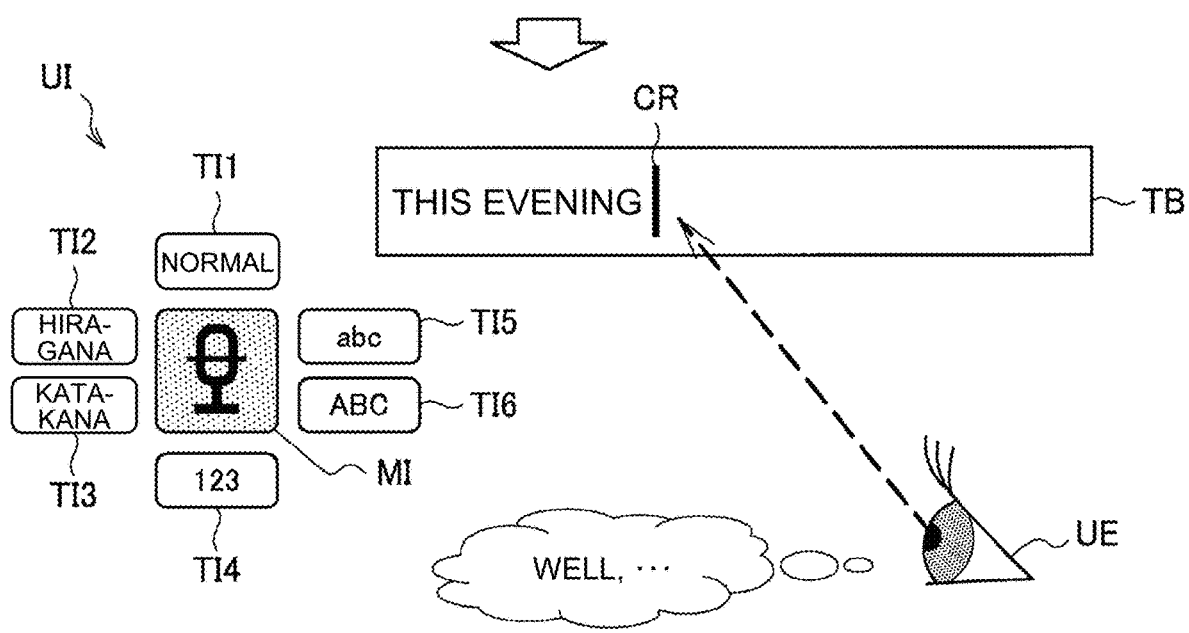

FIG.8
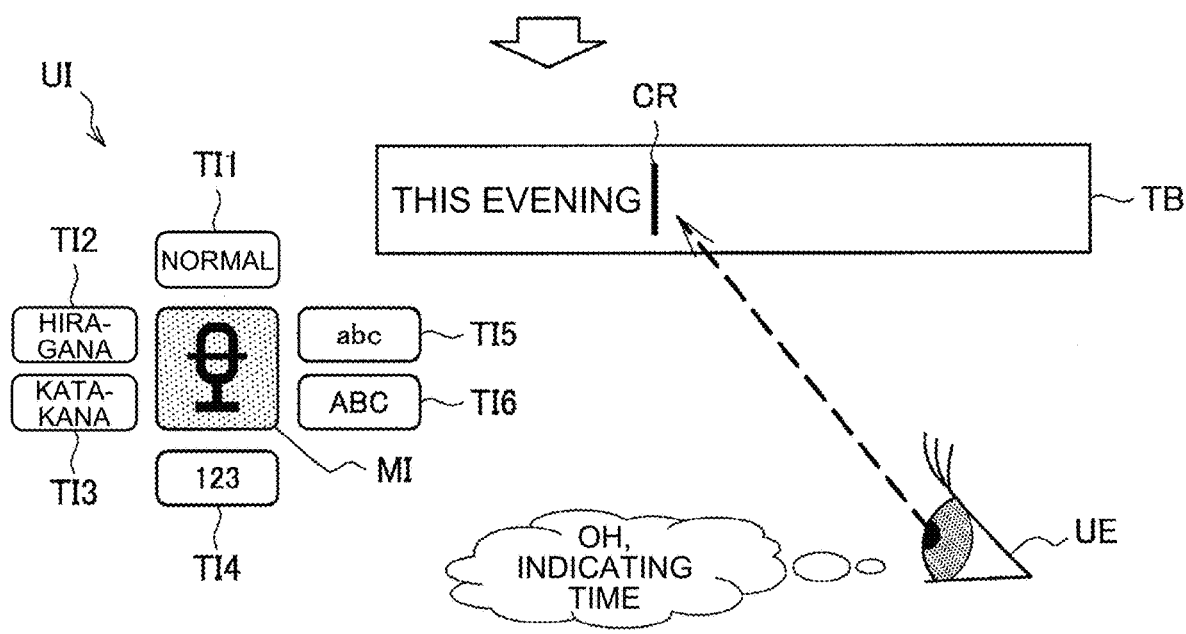
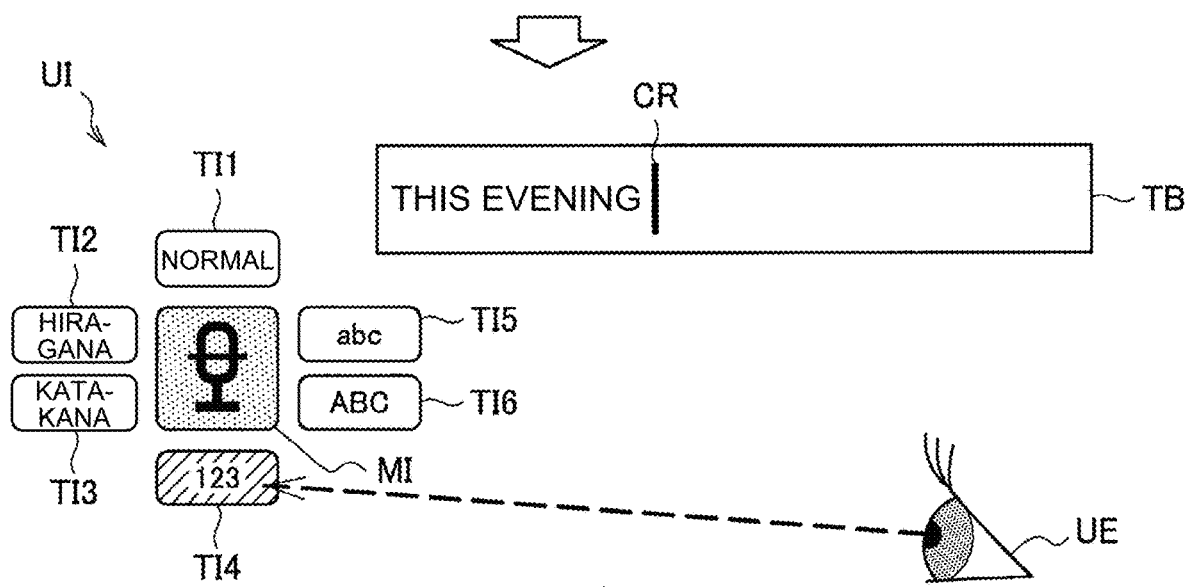

FIG.10
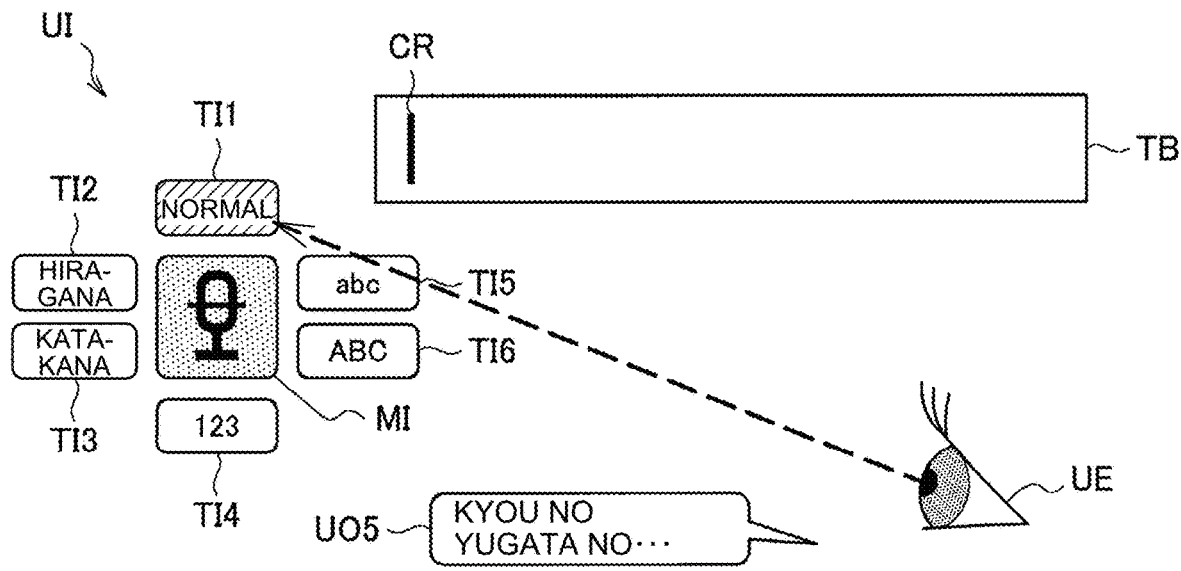
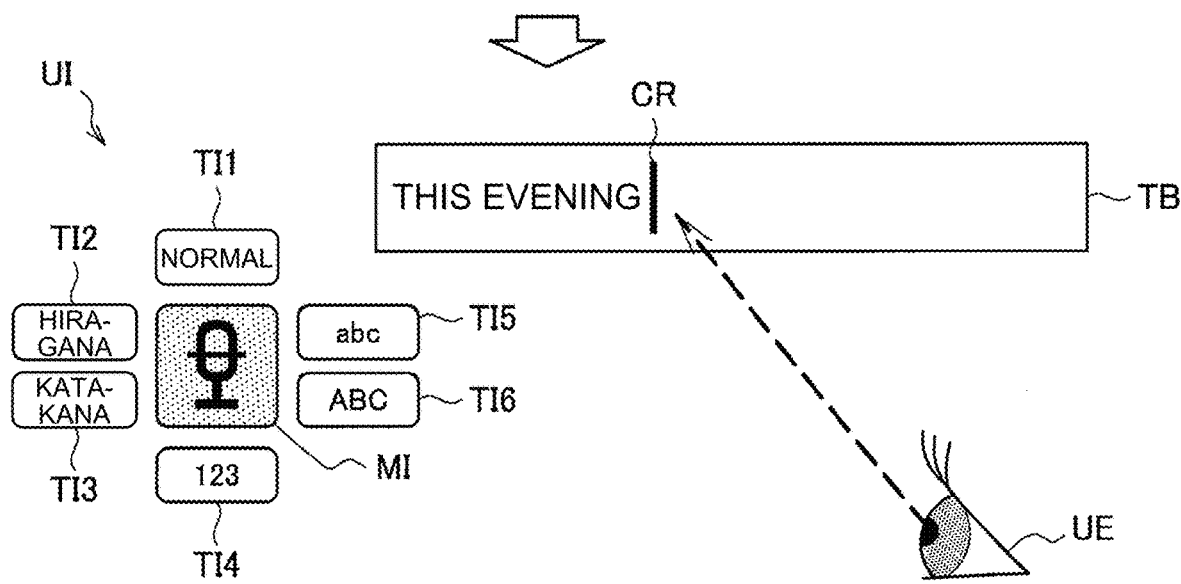

FIG.11
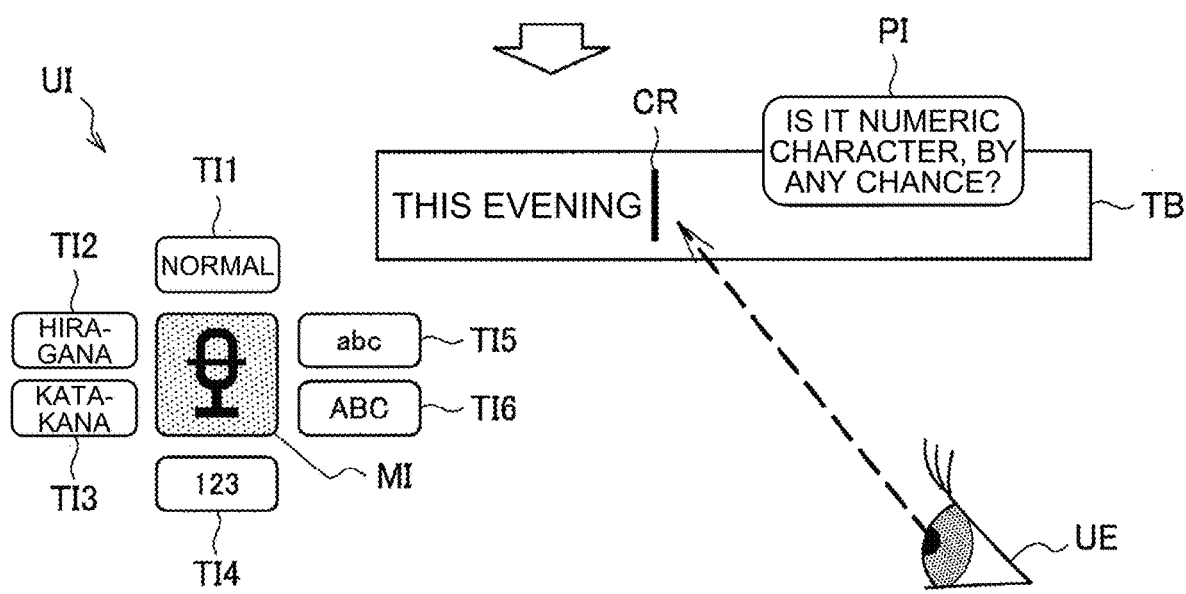
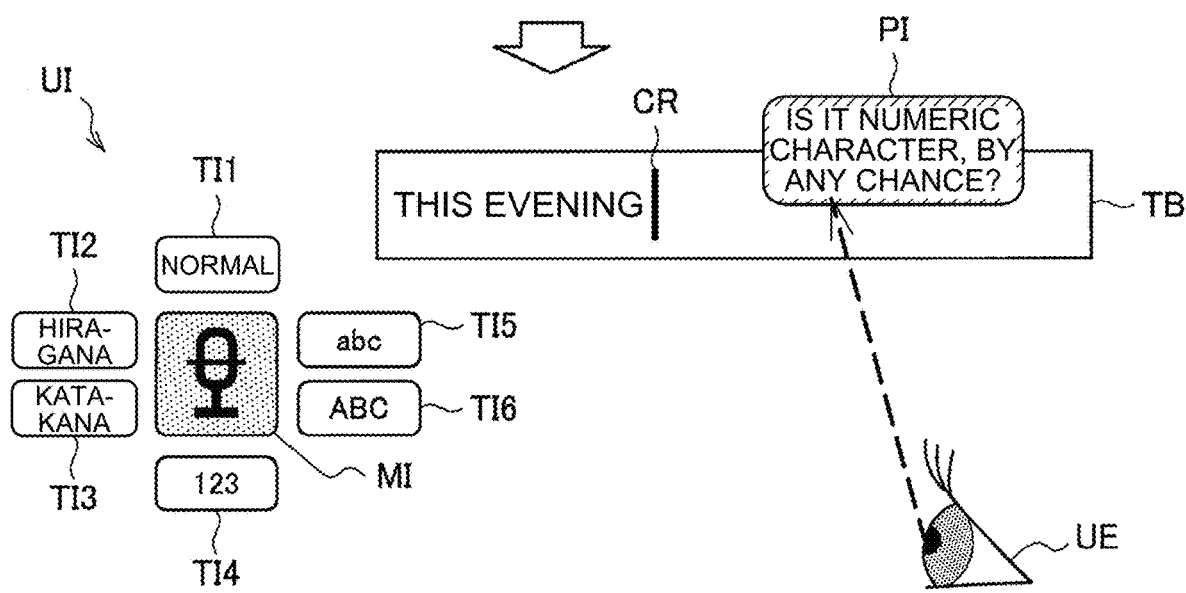

FIG.12
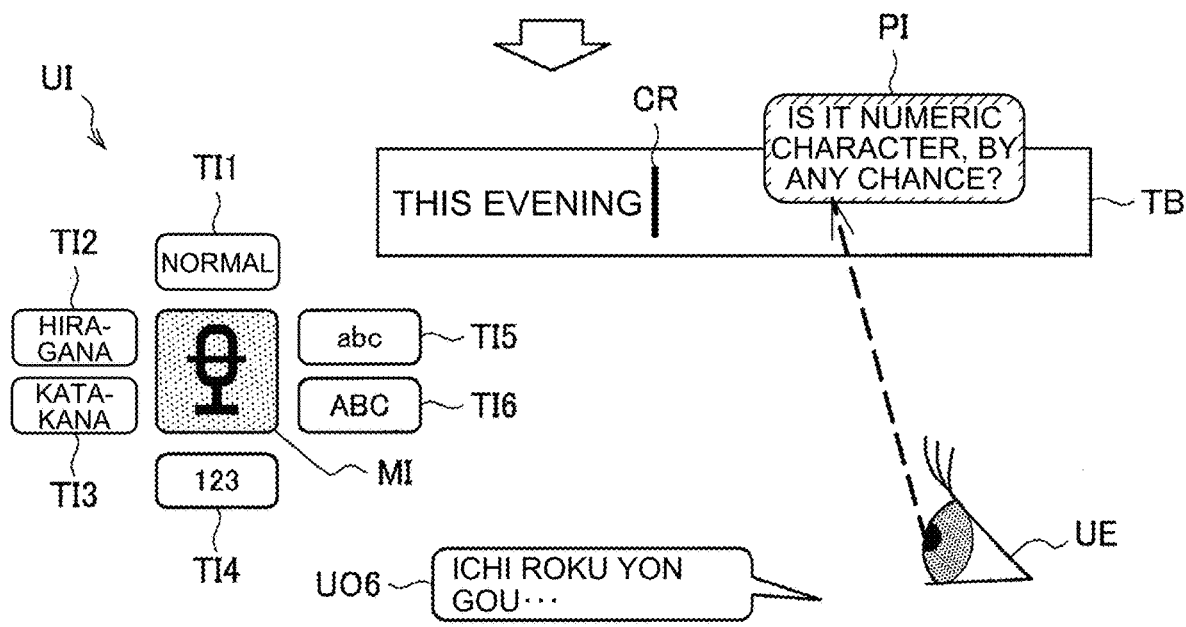
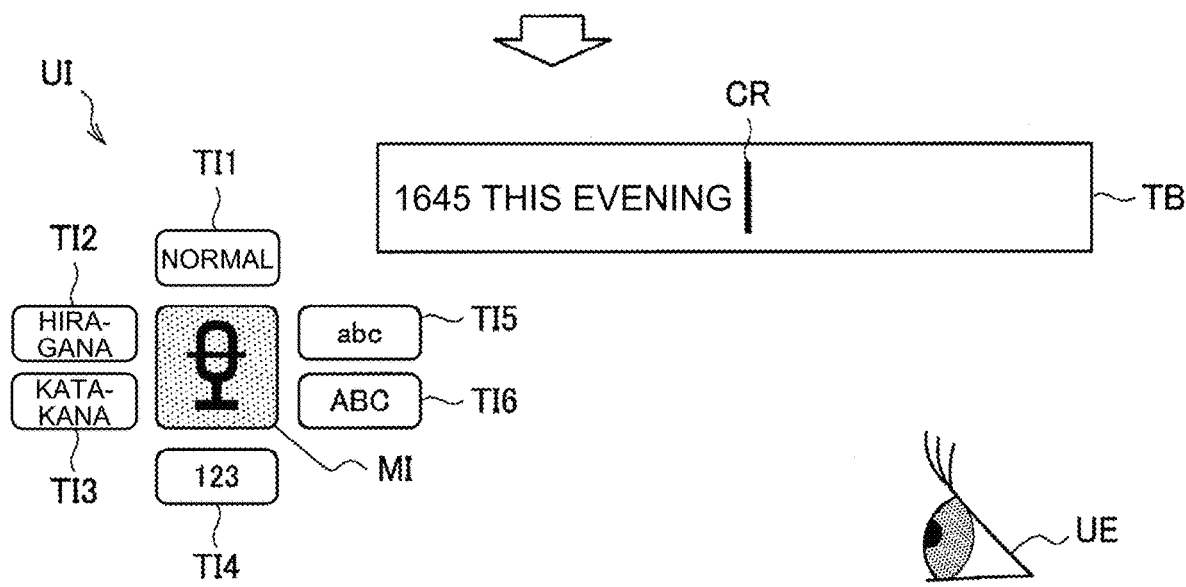

FIG.18
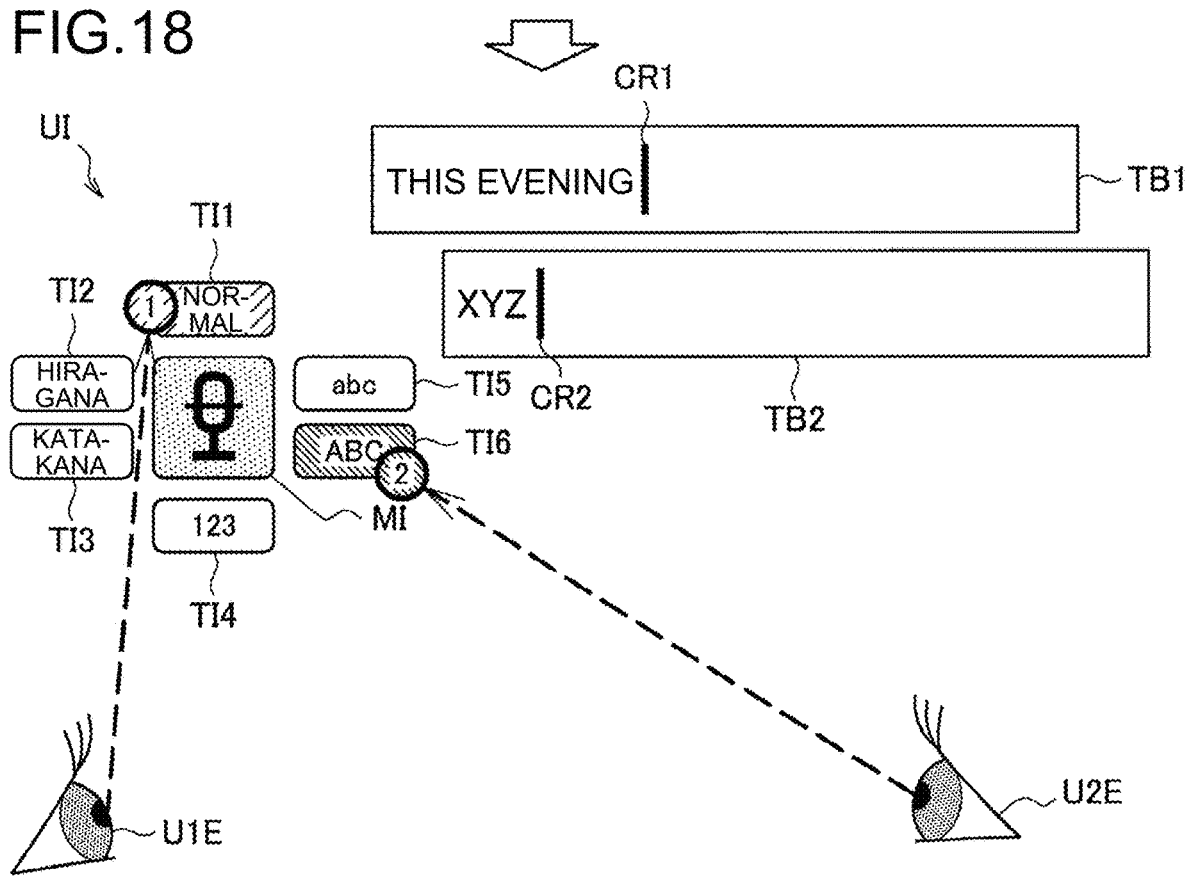
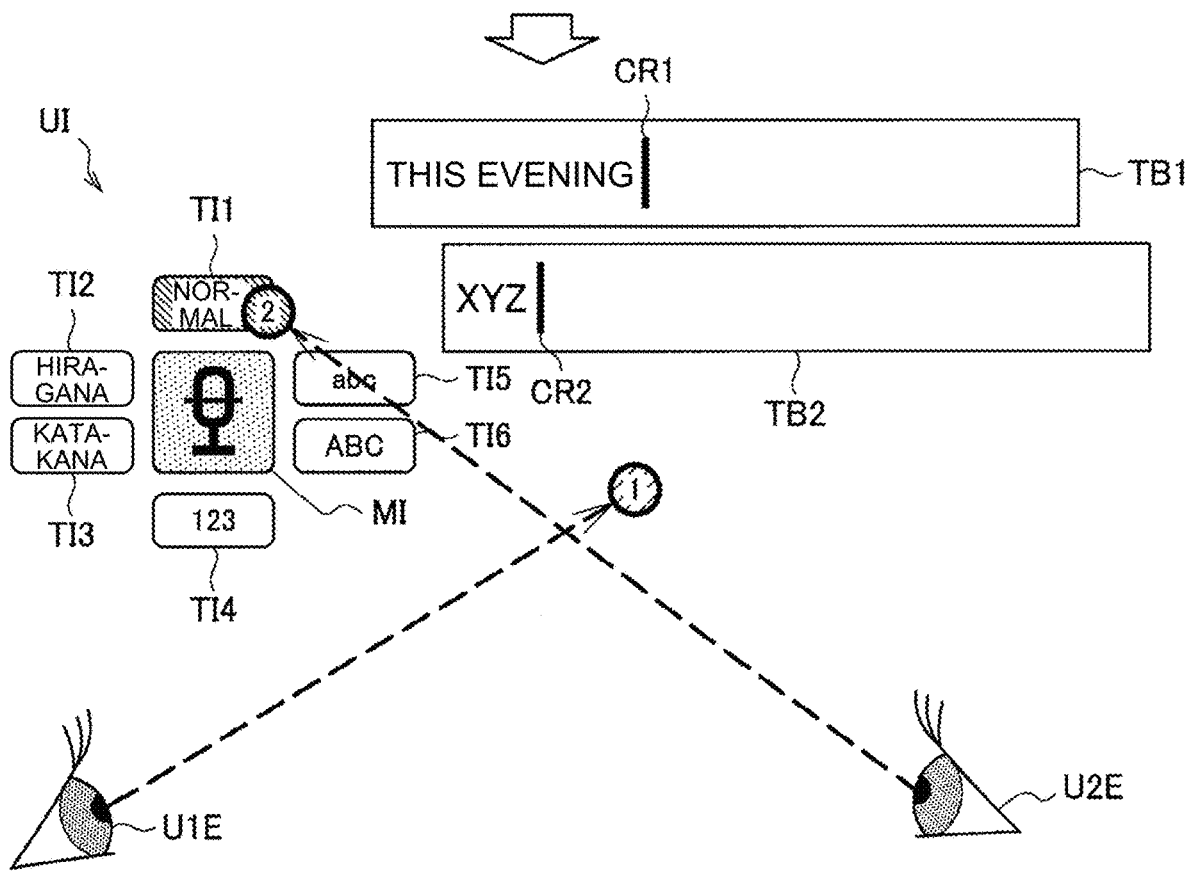

FIG.19
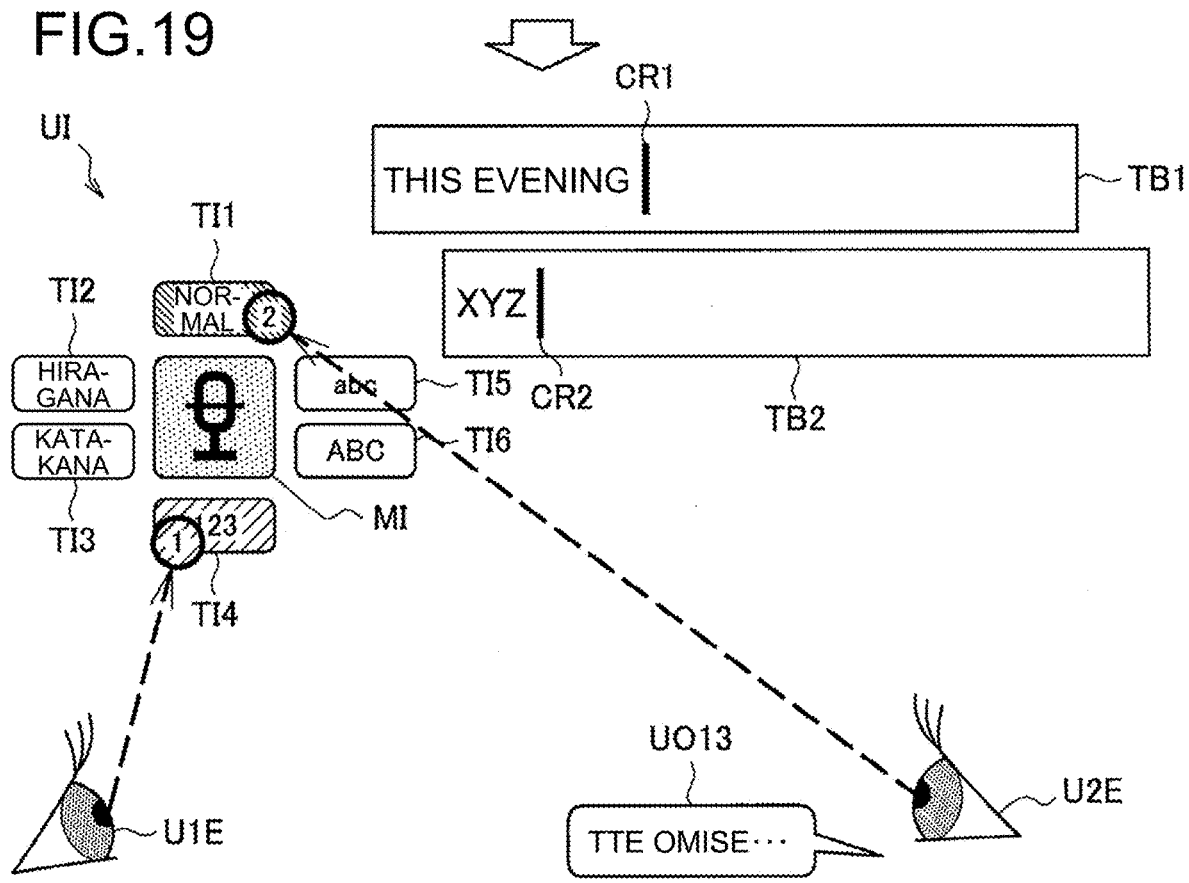
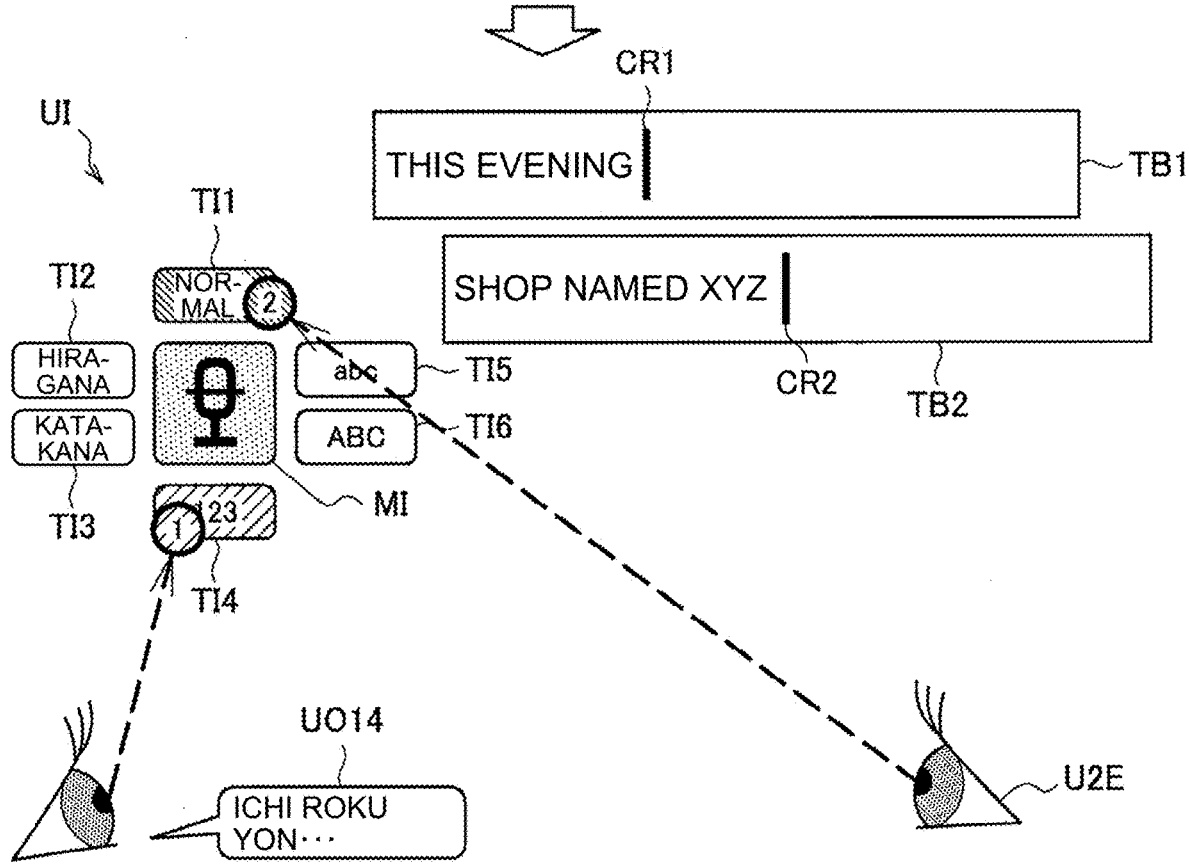

FIG.20
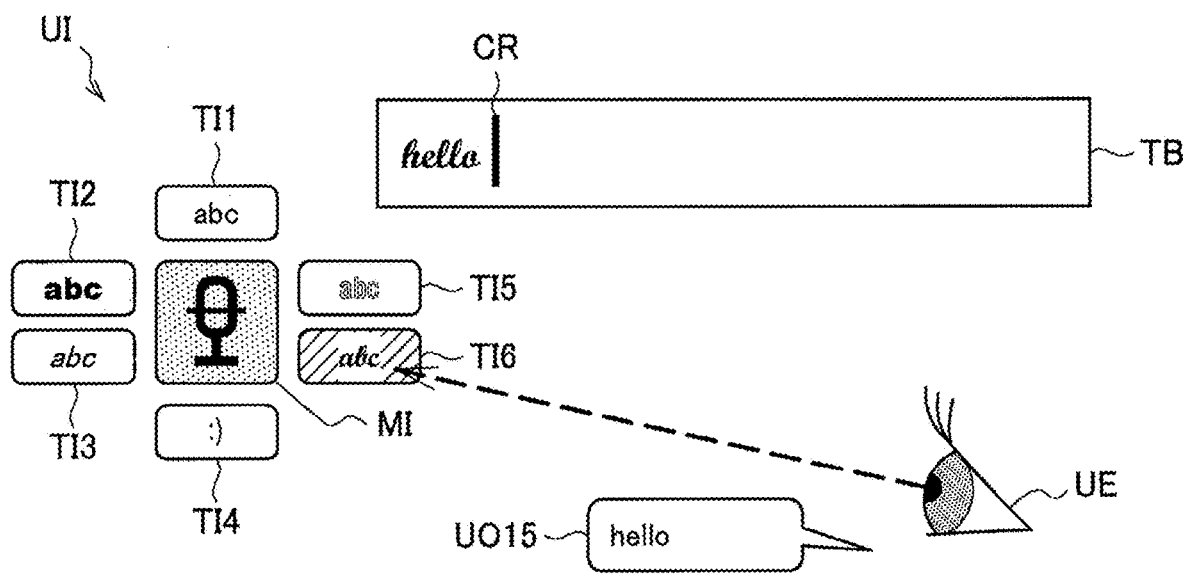
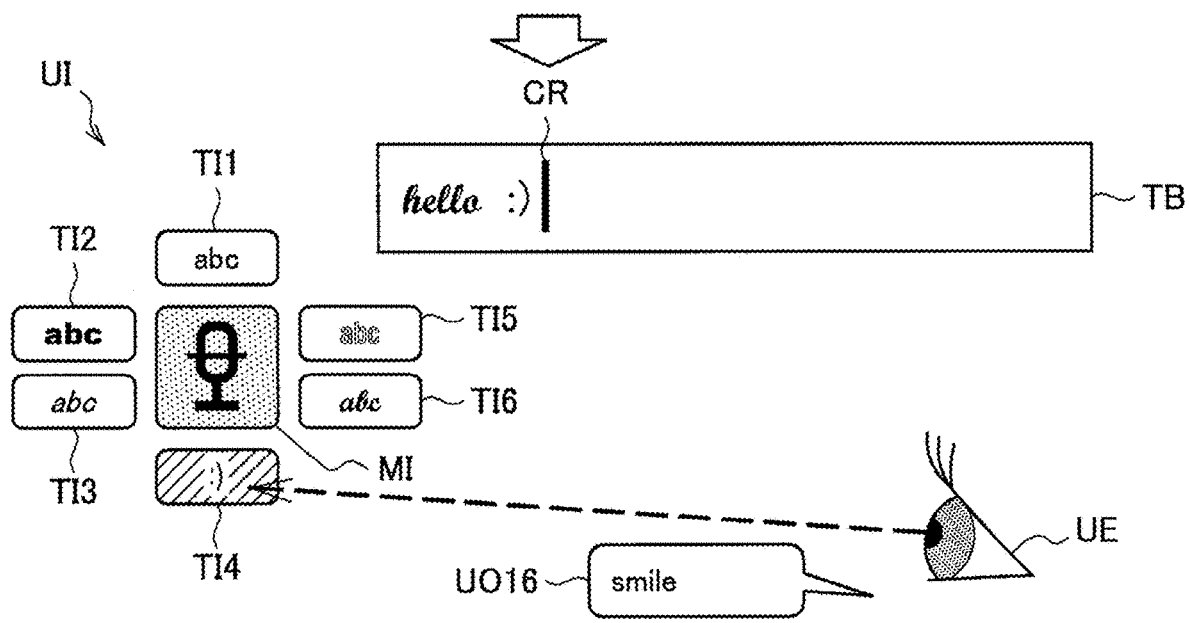

FIG.21
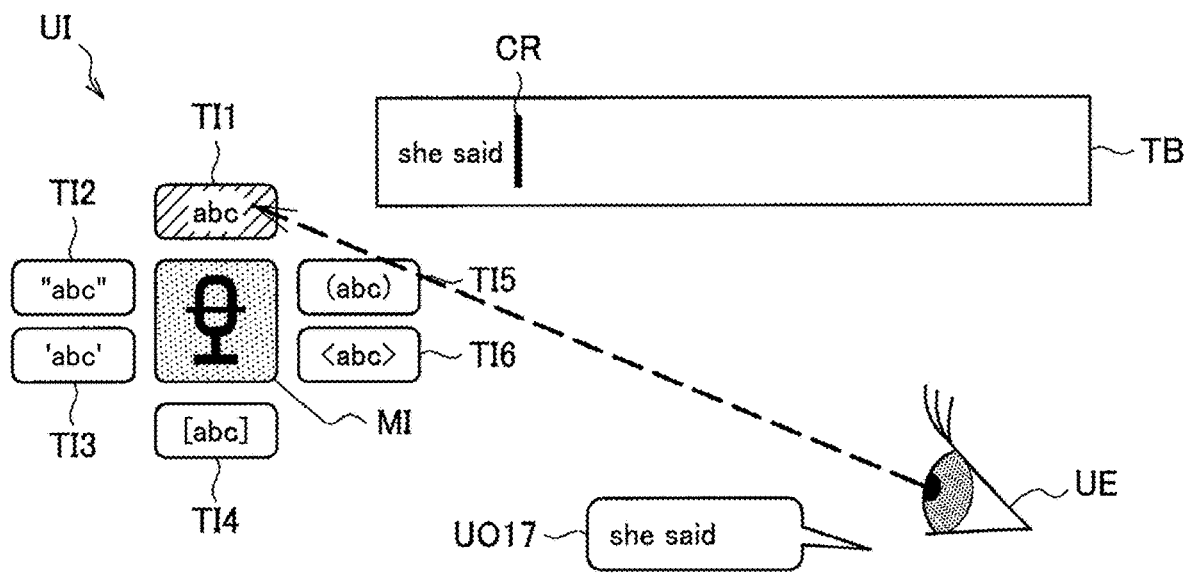
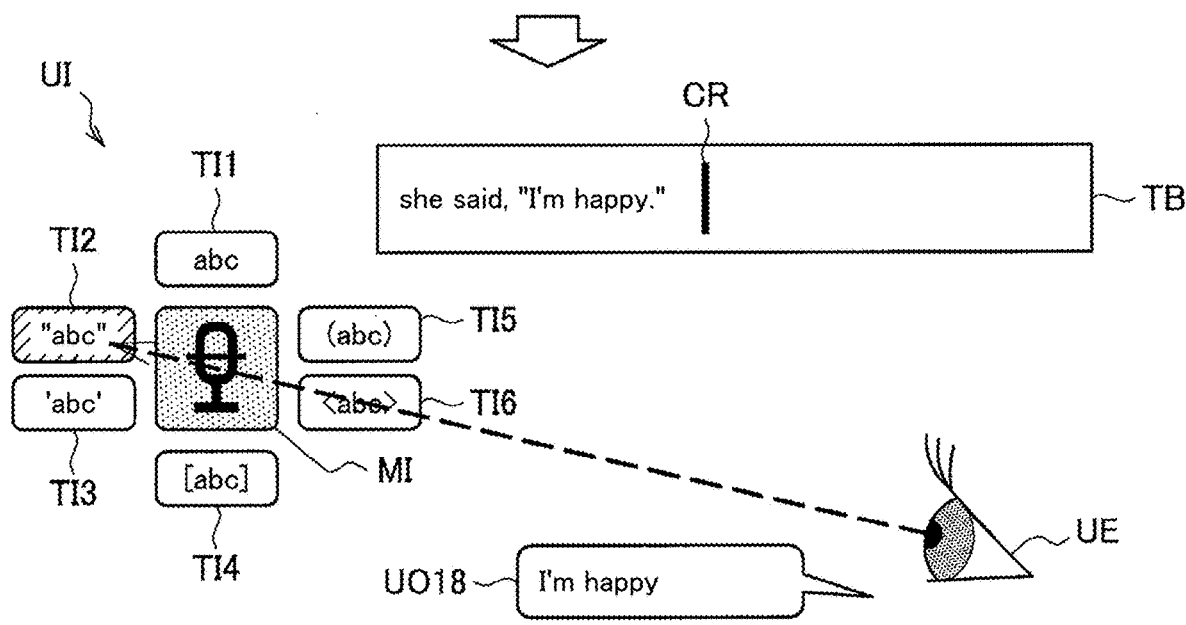

FIG.22
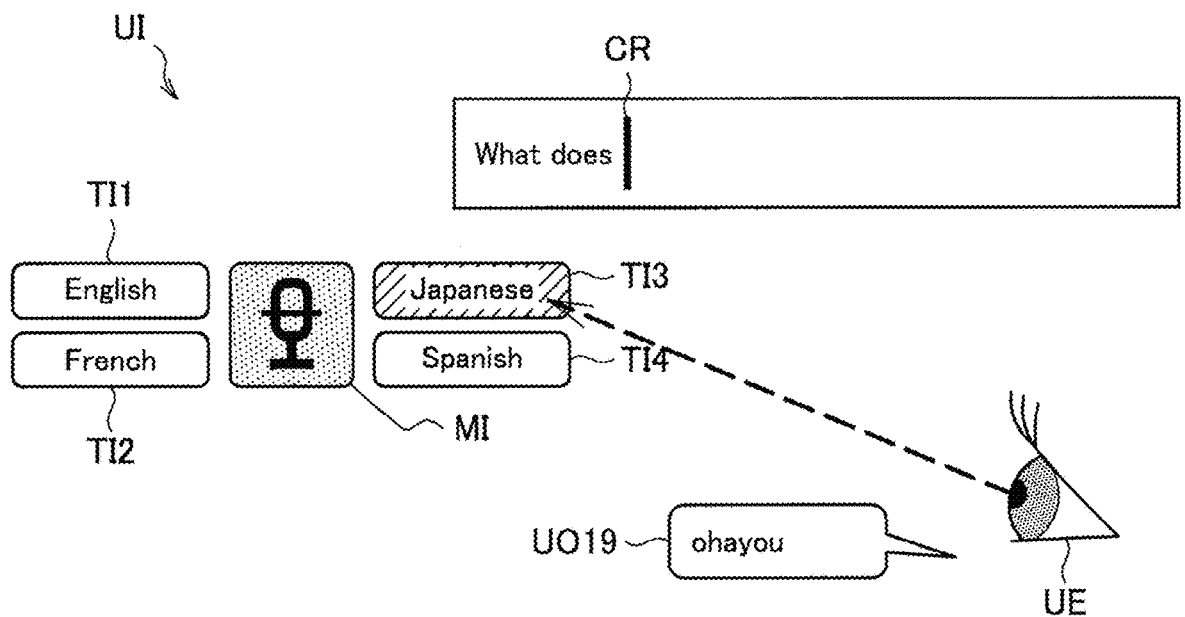
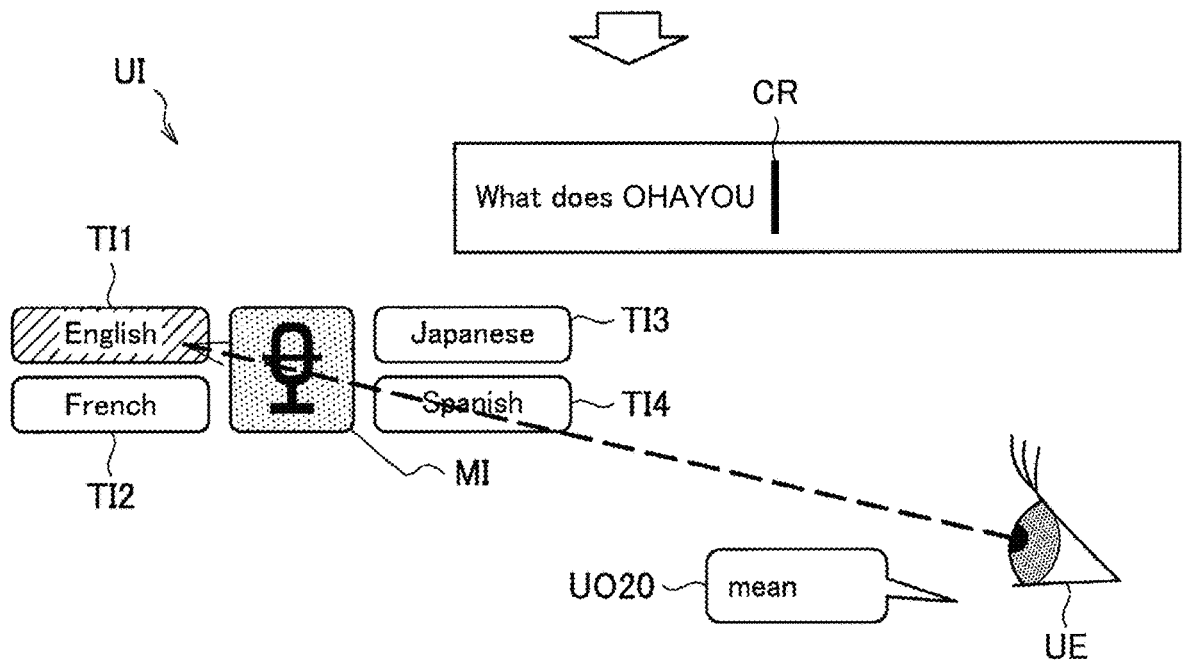

FIG.24
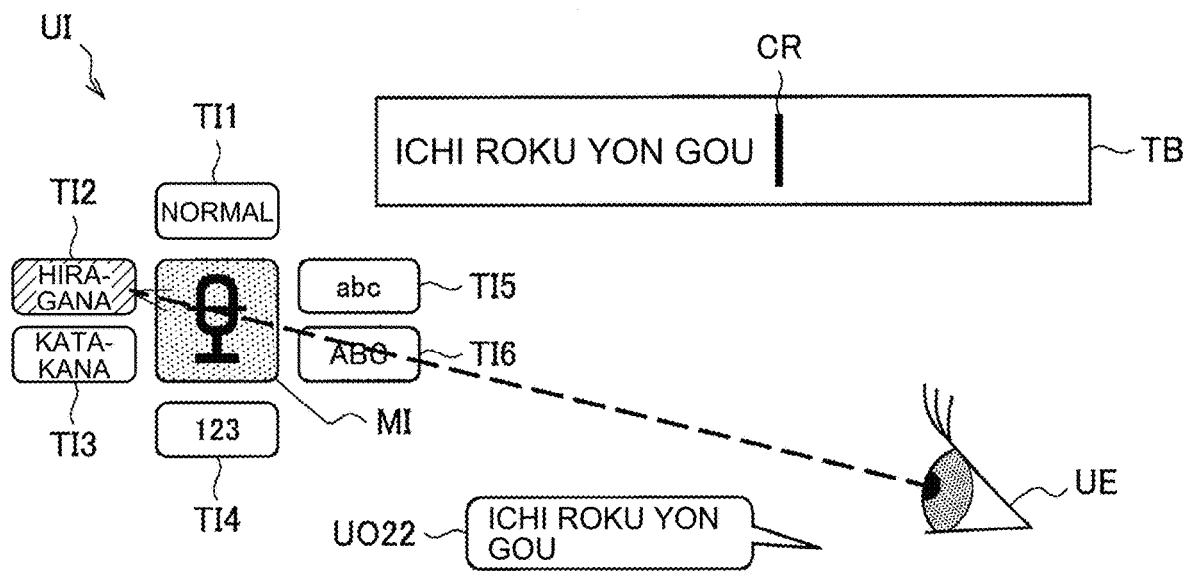
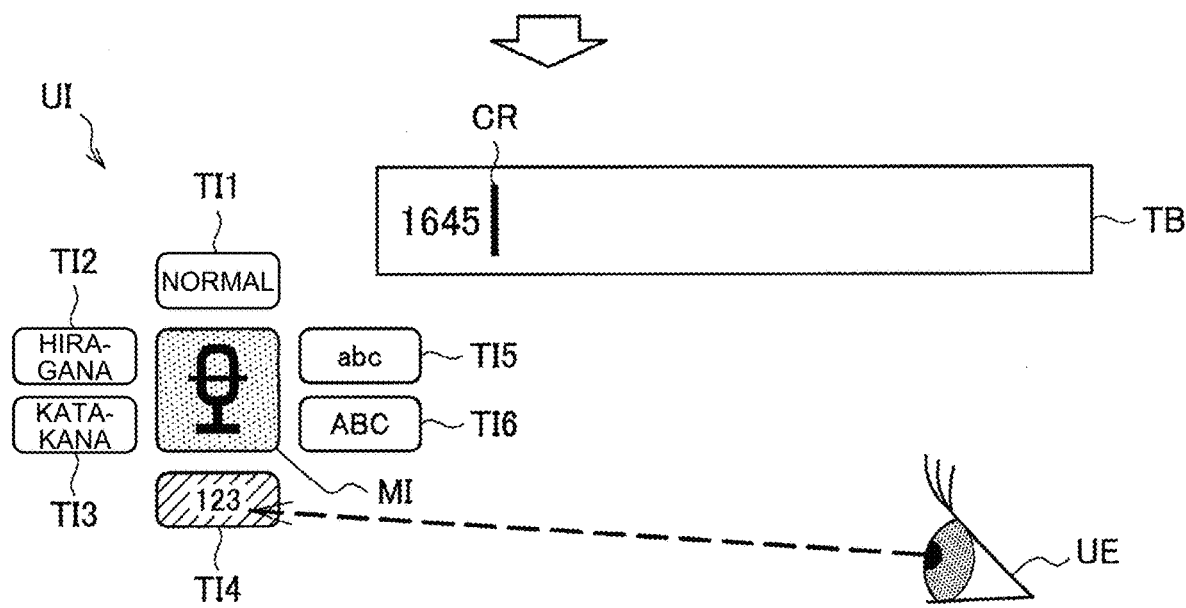

INFORMATION PROCESSING APPARATUS AND INFORMATION PROCESSING METHOD

CROSS-REFERENCE TO RELATED APPLICATIONS

The present application is based on PCT filing PCT/JP2019/041578, filed Oct. 23, 2019, which claims priority to JP 2018-217585, filed Nov. 20, 2018, the entire contents of each are incorporated herein by reference.

FIELD

The present disclosure relates to an information processing apparatus and an information processing method.

BACKGROUND

In recent years, with the development of technologies, various techniques are used to input and control devices. For example, Patent Literature 1 discloses a technology for controlling devices is performed based on a line of sight or voice of a user.

CITATION LIST

Patent Literature

Patent Literature 1: JP 6-51901 A

SUMMARY

Technical Problem

According to the technology described above, it is possible to reduce complicatedness of operating an input device, such as a keyboard or a mouse, and free an action of a hand of the user. However, for example, in some cases, at the time of a character input performed by using voice recognition or the like, an expression intended by the user is not correctly reflected.

Solution to Problem

According to the present disclosure, an information processing apparatus is provided that includes a deciding unit that decides character representation related to speech-to-text conversion of a verbal action performed by a user, wherein the deciding unit decides the character representation for each detected verbal action section based on a detected non-verbal action performed by the user.

Moreover, according to the present disclosure, an information processing method is provided that causes a processor to execute a process including deciding character representation related to speech-to-text conversion of a verbal action performed by a user, wherein the deciding includes deciding the character representation for each detected verbal action section based on a detected non-verbal action performed by the user.

BRIEF DESCRIPTION OF DRAWINGS

FIG. 5 is a diagram illustrating the flow of character representation decision according to the embodiment.

FIG. 6 is a diagram illustrating the flow of character representation decision according to the embodiment.

FIG. 7 is a diagram illustrating the flow of character representation decision according to the embodiment.

FIG. 8 is a diagram illustrating the flow of character representation decision according to the embodiment.

FIG. 10 is a diagram illustrating prediction of character representation according to the embodiment.

FIG. 11 is a diagram illustrating prediction of character representation according to the embodiment.

FIG. 12 is a diagram illustrating prediction of character representation according to the embodiment.

FIG. 18 is a diagram illustrating the flow in a case in which the information processing terminal 10 according to the embodiment simultaneously controls character inputs received from a plurality of users.

FIG. 19 is a diagram illustrating the flow in a case in which the information processing terminal 10 according to the embodiment simultaneously controls character inputs received from a plurality of users.

FIG. 20 is a diagram illustrating an example of control of a typeface based on a line of sight of a user according to the embodiment.

FIG. 21 is a diagram illustrating an example of control of a punctuation mark based on a line of sight of a user according to the embodiment.

FIG. 22 is a diagram illustrating an example of control of a notation language based on a line of sight of a user according to the embodiment.

FIG. 24 is a diagram illustrating post-designation of character representation based on a line of sight according to the embodiment.

DESCRIPTION OF EMBODIMENTS

Figure 1:
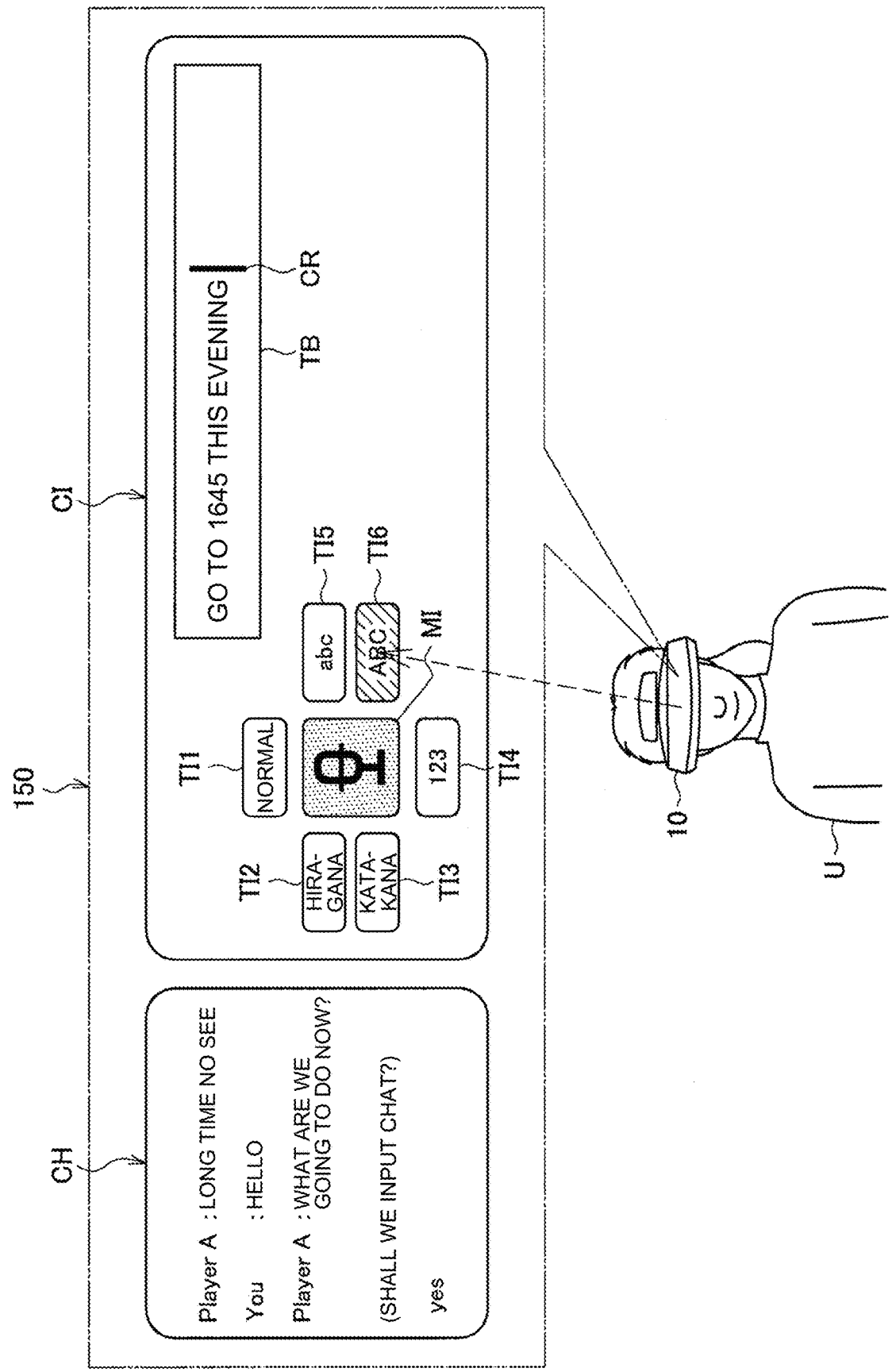
FIG. 1 is a diagram illustrating an overview of an embodiment according to the present disclosure.

Preferred embodiments of the present disclosure will be explained in detail below with reference to accompanying drawings. Furthermore, in this specification and the drawings, by assigning the same reference numerals to components substantially having the same functional configuration, overlapped descriptions thereof will be omitted.

Furthermore, descriptions will be made in the following order.
1. Embodiment
1.1. Overview
1.2. Example of system configuration
1.3. Example of functional configuration of information processing terminal 10
1.4. Example of functional configuration of information processing server 20
1.5. Details of functions
1.6. Flow of processes
2. Example of hardware configuration
3. Summary 1. Embodiment 1.1. Overview First, an overview of one embodiment of the present disclosure will be described. As described above, in recent years, various kinds of input techniques alternative to a mouse or a keyboard are developed. An example of the input techniques described above includes, for example, a character input technique and a device control technique that uses a voice recognition technology. With these techniques, it is possible to free a user's hand from an operation of the device; therefore, the user can perform another action by the user's free hand.

However, for example, in a case of the character input performed by voice recognition, there may be a situation in which an expression intended by the user is not correctly reflected. This kind of situation may possibly occur regardless of accuracy of voice recognition.

For example, in a case of the Japanese language, basically, a sentence is expressed by using three kinds of character types, i.e., hiragana, katakana, and kanji. Furthermore, in a Japanese sentence, Arabic numeric characters, Latin characters, and the like are daily used.

Here, for example, it is assumed a case in which the user desires to input a character string of "GO to 1645 this evening" by using voice recognition. The character string described above is formed of four character types, i.e., kanji (today, evening), hiragana (no, ni), Arabic numeric characters (1645), and a Latin character (GO) represented in uppercase characters.

However, because it is difficult to determine the character types described above from only a speech "kyou no yugata no ichi roku yon gou ni gou" (for convenience sake, represented by hiragana) given by the user, with a generally used voice recognition engine, for example, various character strings indicated below may possibly be output.

Output Example

"today (kanji), no (hiragana), evening (kanji), no (hiragana), 1645 (Arabic numeric characters), ni (hiragana), go (katakana)"

"today (kanji), no (hiragana), evening (kanji), no (hiragana), 1645 (Arabic numeric characters), ni (hiragana), GO (Latin character)"

"today (kanji), no (hiragana), evening (kanji), no (hiragana), 164525 (Arabic numeric characters)"

"today (kanji), no (hiragana), evening (kanji), no (hiragana), 1645 (Arabic numeric characters), ni gou (kanji)"

"today (kanji), no (hiragana), evening (kanji), no (hiragana), ichi roku yon gou ni gou (kanji)"

"today (kanji), no (hiragana), evening (kanji), no (hiragana), 164 (Arabic numeric characters), gou (kanji), 2 (Arabic numeric character), gou (kanji)"

The inconsistencies in the intention stated by the user related to the character representation described above may possibly occur in a language other than the Japanese language. For example, in the case of the English language, "1" is output even when the user desires to input "one".

In this way, in a character input performed by using a general voice recognition technology, a technique for dynamically designating a plurality of character types in a single sentence is not established, which causes a decrease in convenience. Furthermore, usually, because the character types that can be used depends on the specifications of a recognition engine, there may be some cases in which the character string intended by the user is not correctly input.

The technical idea according to the present disclosure has been conceived by focusing on the point described above, and makes it possible to perform a character string input conforming to the intention of the user. For this purpose, the information processing terminal 10 that implements an information processing method according to an embodiment of the present disclosure includes a character representation deciding unit 135 that decides character representation related to speech-to-text conversion of a verbal action performed by a user. Furthermore, one of the features of the character representation deciding unit 135 according to an embodiment of the present disclosure is to decide, based on a detected non-verbal action performed by the above described user, the above described character representation for each detected verbal action section.

Here, the verbal action described above indicates overall actions performed in order to output a linguistic intention in communication. Thus, the verbal action according to the embodiment is represented by, for example, a speech. However, the verbal action according to the embodiment is not always limited to an operation performed by voices, and may also include, for example, movements of a lip, unvoiced whispering, and the like. Thus, the verbal action section described above is defined to be a section in which the above described verbal action is performed by the user. For example, if the verbal action is a voiced speech, the verbal action is a voiced section, and, if the verbal action is a movement of a lip, the verbal action indicates a section in which the lip is moving.

Furthermore, in the non-verbal action described above, actions other than the verbal action performed by the user are widely included. In the non-verbal actions according to the embodiment, for example, eye movements, movements and shapes of a finger or a hand, movements and the orientation of a head portion may also be included.

Namely, the character representation deciding unit 135 according to the embodiment can decide, based on a line of sight or a gesture of the user character representation related to, for example, speech-to-text conversion of a speech for each speech section.

FIG. 1 is a diagram illustrating the overview of an embodiment according to the present disclosure. FIG. 1 illustrates an example of a scene in which a user U who is wearing the information processing terminal 10 corresponding to a head-mounted display performs a character input. Furthermore, FIG. 1 illustrates an exemplary case in which a verbal action according to the embodiment is a voiced speech and a non-verbal action is an eye movement.

In the example illustrated in FIG. 1, the user U is chatting with another user in, for example, a game application or the like. In this case, on a display unit 150 included in the information processing terminal 10, a character input interface UI according to the embodiment is displayed in addition to a game screen and chat history CH. On the character input interface UI according to the embodiment, for example, a text box TB in which a character string that is a voice recognition result of a speech, a caret CR that indicates an input position, a microphone icon MI that indicates an input state of a microphone, and the like are displayed.

Furthermore, on the character input interface UI according to the embodiment, a plurality of character representation icons TI that are used by the user U to designate character representation by a line of sight may also be displayed. In the example illustrated in FIG. 1, six character representation icons TI1 to TI6 are displayed. Furthermore, FIG. 1 illustrates the character representation icon TI used in a case in which the character representation according to the embodiment is a character type, and each of the character representation icons TI1 to TI6 is associated with a different character type.

For example, the character representation icon TI1 may also be an icon for designating, with priority, a normal character type. Here, the normal character type described above indicates a character type that is used for conversion performed based on the specifications of a voice recognition engine.

Furthermore, a character representation icon TI2 is an icon for designating, with priority, hiragana, and a character representation icon TI3 is an icon for designating, with priority, katakana. A character representation icon TI4 is an icon for designating, with priority, an Arabic numeric character. Furthermore, character representation icons TI5 and TI6 are icons for designating, with priority, Latin characters in a lowercase character and an uppercase character, respectively.

When the character representation icons TI2 to TI6 are designated by the user U, hiragana, katakana, an Arabic numeric character, a lowercase Latin character, or an uppercase Latin character may also be used to output, with priority, a character string within an available range in which variance does not occur in a voice recognition result.

For example, in the example illustrated in FIG. 1, a character string is illustrated obtained when, after the character string of "to 1645 this evening" is output to the text box TB, the user U gave a speech of "go" by fixedly staring the character representation icon TI6. In this case, the speech of "go" described above is output as "GO" by a uppercase Latin character associated with the character representation icon TI6 fixedly stared by user U before the speech.

In the above, the overview of the embodiment has been described. In this way, the information processing terminal 10 according to the embodiment can decide character representation for each voice section based on the non-verbal action of the user in accordance with the speech. With the above described function held by the information processing terminal 10 according to the embodiment, in an input of a character string performed by a speech or the like, it is possible to dynamically change a plurality of pieces of character representation in a single sentence, which makes it possible to input a character string conforming to the intension of the user.

Furthermore, in the description above by using FIG. 1, as an example of the character representation according to the embodiment, a case in which the information processing terminal 10 designates the character type has been described; however, the character representation according to the embodiment is not limited to the example described above. The character representation according to the embodiment may also widely include various kinds of representation related to visual effects of the voice recognition results. A specific example of the character representation according to the embodiment will be described later.

1.2. System Configuration Example

Figure 2:
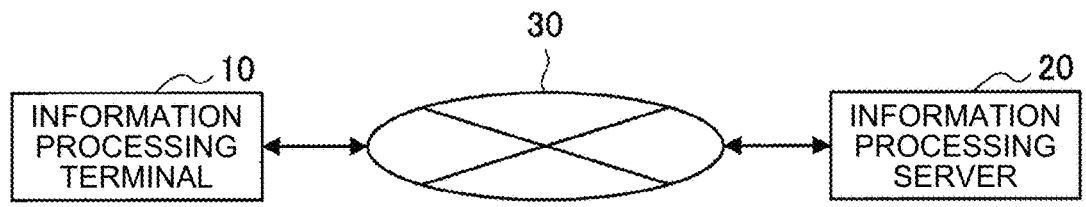
FIG. 2 is a block diagram illustrating an example of a configuration of an information processing system according to the embodiment.

In the following, a configuration example of an information processing system according to an embodiment of the present disclosure will be described. FIG. 2 is a block diagram illustrating an example of a configuration of the information processing system according to the embodiment. With reference to FIG. 2, the information processing system according to the embodiment includes the information processing terminal 10 and the information processing server 20. Furthermore, the information processing terminal 10 and the information processing server 20 are connected so as to be capable of communicating with each other via a network 30.

Information Processing Terminal 10

The information processing terminal 10 according to the embodiment is an information processing apparatus that provides the character input interface UI to a user. Furthermore, the information processing terminal 10 collects sensing information related to the verbal actions and the non-verbal actions performed by the user described above. For example, when a line of sight of the user is used to decide character representation, the information processing terminal 10 according to the embodiment may also be a head-mounted display or a dedicated device that can detect, for example, a line of sight.

Information Processing Server 20

The information processing server 20 according to the embodiment is an information processing apparatus that performs various kinds of recognition processes based on the sensing information collected by the information processing terminal 10. For example, the information processing server 20 according to the embodiment performs voice recognition based on the voice of the user collected by the information processing terminal 10. Furthermore, for example, the information processing server 20 according to the embodiment performs line-of-sight recognition based on an image of the eyeballs collected by the information processing terminal 10. The type of the recognition process performed by the information processing server 20 according to the embodiment is designed in accordance with the verbal actions or the non-verbal actions related to decision of the character representation.

Network 30

The network 30 has a function for connecting the information processing terminal 10 and the information processing server 20. The network 30 may also include a public line network, such as the Internet, a telephone line network, or satellite communication network; various kinds of local area networks (LANs), wide area networks (WANs), including Ethernet (registered trademark); or the like. Furthermore, the network 30 may also include a dedicated line network, such as an Internet Protocol-Virtual Private Network (IP-VPN). Furthermore, the network 30 may also include a wireless communication network, such as Wi-Fi (registered trademark), or Bluetooth (registered trademark).

In the above, the configuration example of the information processing system according to an embodiment of the present disclosure has been described. Furthermore, the configuration described by using FIG. 2 is only an example and the configuration of the information processing system according to the embodiment is not limited to the example described above. For example, the functions held by the information processing terminal 10 and the information processing server 20 may also be implemented by a single device or three or more devices. The configuration of the information processing system according to the embodiment may be flexibly modified in accordance with specifications or operations.

1.3. Example of Functional Configuration of the Information Processing Terminal 10

Figure 3:
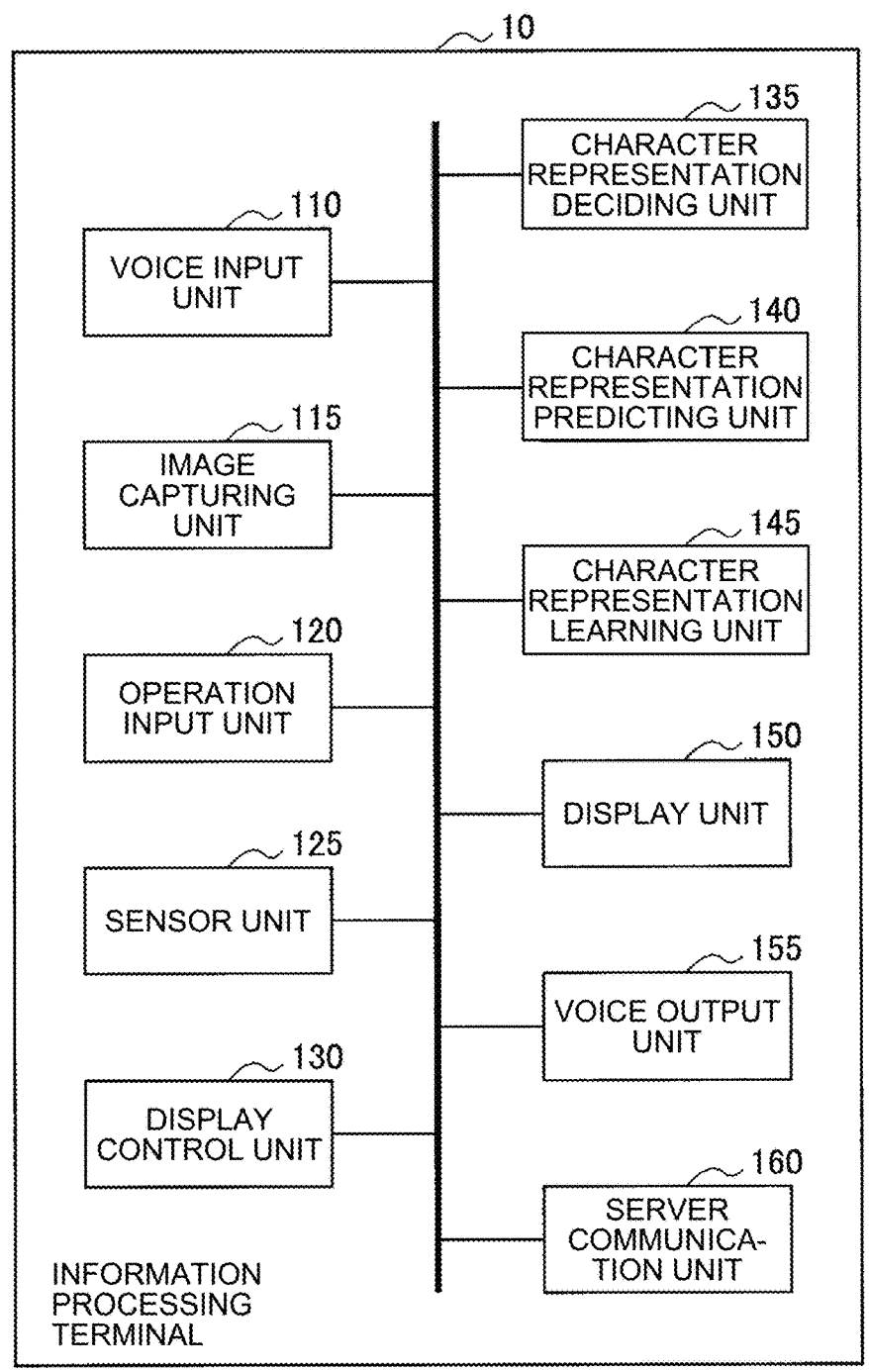
FIG. 3 is a block diagram illustrating an example of a functional configuration of an information processing terminal 10 according to the embodiment.

In the following, an example of a functional configuration of the information processing terminal 10 according to an embodiment of the present disclosure will be described. FIG. 3 is a block diagram illustrating an example of the functional configuration of the information processing terminal 10 according to the embodiment. With reference to FIG. 3, the information processing terminal 10 according to the embodiment includes a voice input unit 110, an image capturing unit 115, an operation input unit 120, a sensor unit 125, a display control unit 130, the character representation deciding unit 135, a character representation predicting unit 140, a character representation learning unit 145, the display unit 150, a sound output unit 155, and a server communication unit 160.

Voice Input Unit 110

The voice input unit 110 according to the embodiment collects sounds of, for example, speeches given by a user. For this purpose, the voice input unit 110 according to the embodiment includes a sound collecting unit, such as a microphone. Furthermore, in a case of presuming the direction of the sound source in order to identify a speaker or the like, the voice input unit 110 includes two or more sound collecting units.

Image Capturing Unit 115

The image capturing unit 115 according to the embodiment captures an image of a user or the like. For this purpose, the image capturing unit 115 according to the embodiment includes an image capturing sensor. Furthermore, the image capturing unit 115 according to the embodiment may also include a light source, such as an infrared LED, in order to capture an image that is used for line-of-sight recognition of the user.

Operation Input Unit 120

The operation input unit 120 according to the embodiment detects an operation input made by a user. For this purpose, the operation input unit 120 according to the embodiment includes, for example, a touch panel, a switch, a button, and the like.

Sensor Unit 125

The sensor unit 125 according to the embodiment collects various kinds of sensing information related to a user or the information processing terminal 10. For this purpose, the sensor unit 125 according to the embodiment includes, for example, an acceleration sensor, a gyro sensor, a geomagnetic sensor, or the like.

Display Control Unit 130

The display control unit 130 according to the embodiment controls display of the character input interface UI illustrated in FIG. 1. For example, by using the character representation decided by the character representation deciding unit 135, the display control unit 130 according to the embodiment may control display of a text based on recognition of a verbal action. The function held by the display control unit 130 according to the embodiment will be separately described in detail later.

Character Representation Deciding Unit 135

The character representation deciding unit 135 according to the embodiment (also simply referred to as a deciding unit) has a function for deciding character representation related to a text of a verbal action performed by a user. Furthermore, one of the features of the character representation deciding unit 135 according to the embodiment is to decide, based on a detected non-verbal action performed by the user, character representation for each detected verbal action section.

As described above, the verbal action according to the embodiment includes, for example, a speech given by a user. At this time, the character representation deciding unit 135 according to the embodiment may decide, based on the non-verbal action performed by the user in accordance with the speech, character representation for each voice section. For example, in a case in which the non-verbal action is an eye movement of the user, the character representation deciding unit 135 can decide character representation for each voice section based on a line of sight of the user, as illustrated in FIG. 1. The function held by the character representation deciding unit 135 according to the embodiment will be separately described in detail later.

Character Representation Predicting Unit 140

The character representation predicting unit 140 according to the embodiment (also simply referred to as an predicting unit) has a function for predicting, based on a tendency of a character input that has been made by a user and that has been learned by the character representation learning unit 145, character representation related to speech-to-text conversion of the verbal action performed by the user.

Character Representation Learning Unit 145

The character representation learning unit 145 according to the embodiment (also simply referred to as a learning unit) has a function for predicting the tendency of the character input of a user based on a track record of the character inputs performed by the user or a correction track record of the recognition results.

Display Unit 150

The display unit 150 according to the embodiment displays the character input interface UI based on the control performed by the display control unit 130. For this purpose, the display unit 150 according to the embodiment includes various kinds of displays.

Sound Output Unit 155

The sound output unit 155 according to the embodiment includes a function for outputting various kinds of sounds, such as synthesized voice. For this purpose, the sound output unit 155 according to the embodiment includes an amplifier, a loudspeaker, or the like.

Server Communication Unit 160

The server communication unit 160 according to the embodiment performs information communication with the information processing server 20 via the network 30. For example, the server communication unit 160 according to the embodiment transmits, to the information processing server 20, sound information, images, and another piece of sensor information collected by the voice input unit 110, the image capturing unit 115, and the sensor unit 125, and receives the result of the recognition process.

In the above, an example of the functional configuration of the information processing terminal 10 according to an embodiment of the present disclosure has been described.

Furthermore, the configuration described above by using FIG. 3 is only an example and the functional configuration of the information processing terminal 10 according to the embodiment is not limited to the example described above. For example, the functions held by the character representation deciding unit 135 or the like described above may also be provided as the function of the information processing server 20. The functional configuration of the information processing terminal 10 according to the embodiment can be flexibly modified in accordance with specifications or operations.

1.4. Example of Functional Configuration of the Information Processing Server 20

Figure 4:
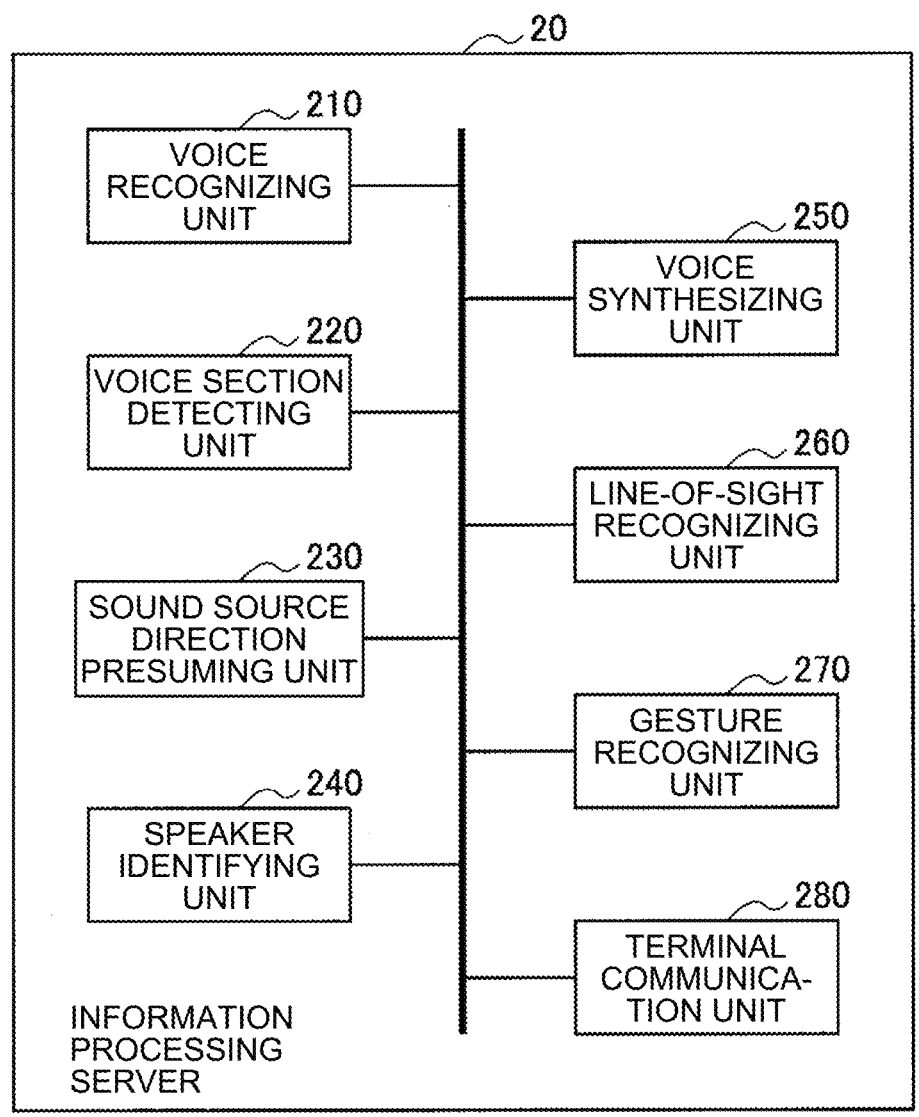
FIG. 4 is a block diagram illustrating an example of a functional configuration of an information processing server 20 according to the embodiment.

In the following, an example of a functional configuration of the information processing server 20 according to an embodiment of the present disclosure will be described. FIG. 4 is a block diagram illustrating an example of the functional configuration of the information processing server 20 according to the embodiment. With reference to FIG. 4, the information processing server 20 according to the embodiment includes a voice recognizing unit 210, a voice section detecting unit 220, a sound source direction presuming unit 230, a speaker identifying unit 240, a speech synthesizing unit 250, a line-of-sight recognizing unit 260, a gesture recognizing unit 270, and a terminal communication unit 280.

Voice Recognizing Unit 210

The voice recognizing unit 210 according to the embodiment performs automatic speech recognition (ASR) based on the sound information related to the speech given by a user collected by the information processing terminal 10. The voice recognizing unit 210 may perform voice recognition by using, for example, a known technology.

Voice Section Detecting Unit 220

The voice section detecting unit 220 according to the embodiment performs voice section detection (VAD: Voice Activity Detection) based on the sound information related to the speech given by a user collected by the information processing terminal 10. For example, voice section detection may be performed by using a known technology.

Sound Source Direction Presuming Unit 230

The sound source direction presuming unit 230 according to the embodiment presumes the direction of a sound source position based on the sound information collected by the information processing terminal 10. For example, presuming the direction of the sound source may be performed by using a known technology.

Speaker Identifying Unit 240

The speaker identifying unit 240 according to the embodiment identify a user who made a speech. The speaker identifying unit 240 according to the embodiment can identify a speaker by using a technology, such as person recognition, face recognition, lip recognition, and the like.

Speech Synthesizing Unit 250

The speech synthesizing unit 250 according to the embodiment synthesizes speeches that have been given by a user and that have been subjected to speech-to-text conversion performed by the voice recognizing unit 210, or synthesizes voices related to another system speech.

Line-Of-Sight Recognizing Unit 260

The line-of-sight recognizing unit 260 according to the embodiment recognizes, based on an eyeball image of a user captured by the information processing terminal 10, the position of a line of sight of the user. The line-of-sight recognizing unit 260 according to the embodiment may perform line-of-sight recognition by using a known technology.

Gesture Recognizing Unit 270

The gesture recognizing unit 270 according to the embodiment recognizes a gesture made by a hand or a finger of a user, a head region, or another part of the body based on an image captured by the information processing terminal 10 or sensor information collected by the information processing terminal 10. The gesture recognizing unit 270 according to the embodiment may recognize various kinds of gestures by using a known technology.

Terminal Communication Unit 280

The terminal communication unit 280 according to the embodiment performs information communication with the information processing terminal 10 via the network 30. For example, the terminal communication unit 280 according to the embodiment receives sound information, images, and another piece of sensor information from the information processing terminal 10 and transmits, to the information processing terminal 10, the results of the processes obtained from each of the functions described above.

In the above, an example of the functional configuration of the information processing server 20 according to an embodiment of the present disclosure has been described. Furthermore, the configuration described above by using FIG. 4 is only an example and the functional configuration of the information processing server 20 according to the embodiment is not limited to the example described above. The function included in the information processing server 20 according to the embodiment may also be designed in accordance with a verbal action and a non-verbal action targeted for recognition. The functional configuration of the information processing server 20 according to the embodiment can be flexibly modified in accordance with specifications or operations.

1.5. Details of Function

In the following, decision of character representation performed by the information processing terminal 10 according to the embodiment will be described in detail. FIG. 5 to FIG. 9 are diagrams each illustrating the flow of character representation decision according to the embodiment. Furthermore, in a description below, a description will be given, as a main example, a case in which a verbal action according to the embodiment is a voiced speech given by a user and a non-verbal action is an eye movement of the user. Furthermore, as an example of character representation, a character type is used.

The upper portion of FIG. 5 illustrates the character input interface UI before a start of a character input given by a speech of a user. In this stage, the microphone icon MI is displayed by a color or an expression indicating a situation in which a voice input is not started. Furthermore, the display control unit 130 may perform control such that the character representation icons TI1 to TI6 are not displayed.

Here, when a start instruction of the voice input performed by the user is detected, the character input interface UI shifts to the state illustrated in the middle portion of FIG. 5. Furthermore, the start instruction described above may also be performed by, for example, a speech of an activation word that instructs to activate a voice recognition function, an operation of the switch or the button included in the operation input unit 120, or a touch in the vicinity of the microphone icon MI or the caret CR provided on the touch panel that is integrally included in the display unit 150.

When the start instruction described above is detected, the display control unit 130 may also highlight the microphone icon MI by, for example, changing the color and indicate to the user that a voice input has been started. Furthermore, the display control unit 130 displays, on the display unit 150, the plurality of the character representation icons TI associated with a plurality of pieces of character representation that can be selected by the user.

At this time, the display control unit 130 according to the embodiment may also display the character representation icon TI at the position in which a line-of-sight movement from the text box TB that is an output position of the text that is the result of voice recognition obtained by the voice recognizing unit 210 is within a predetermined distance. With the control described above performed by the display control unit 130 according to the embodiment, it is possible to reduce a burden of designation of character representation imposed on the user and it is also possible to easily change dynamic character representation for each voice section.

Furthermore, from this stage, tracking of line-of-sight recognition of the user may also be started by the line-of-sight recognizing unit 260. In the drawing, an eyeball UE of the user and a line of sight of the user are schematically illustrated together with the broken line. Furthermore, the display control unit 130 may also perform control such that the position of the line of sight of the user recognized by the line-of-sight recognizing unit 260 is displayed by a pointer or the like.

After this, as illustrated in the lower portion of FIG. 5, if the line of sight position of the user U stays at the character representation icon TI more than threshold time, the character representation deciding unit 135 according to the embodiment can apply the character representation associated with the character representation icon TI that has been fixedly stared by the user to speech-to-text conversion of the subsequent voice section. In a case of the example illustrated in FIG. 5, the character representation deciding unit 135 applies the character type "normal" associated with the character representation icon TI1 that has been fixedly stared by the user to the speech-to-text conversion of the subsequent voice section.

Furthermore, if character representation is decided by the character representation deciding unit 135, the display control unit 130 highlights the character representation icon TI associated with the decided character representation by, for example, changing the color. With this control, it is possible for the user to intuitively grasp the character representation that is currently set.

Subsequently, a description will be continuously given with reference to FIG. 6. The upper portion of FIG. 6 illustrates the state in which the user has started a speech UO1. At this time, the character representation deciding unit 135 according to the embodiment may also fix the applying character representation until the end of detection of the voice section related to the speech section UO1.

For example, as illustrated in the lower portion of FIG. 6, it is assumed that, when the text associated with the speech UO1 given by the user is started to be displayed on the text box TB, a line of sight of the user moves to the vicinity of the text box TB, as illustrated in the drawing. Furthermore, it is difficult to continuously fix the line of sight to a single point in addition to the display of the text.

With the fixation of character representation described above performed by the character representation deciding unit 135 according to the embodiment, it is possible to avoid character representation from being frequently changed and prevent conversion unintended by the user even when the line of sight of the user moves to the other character representation icon TI during the speech UO1 or UO2.

Furthermore, for example, as illustrated in the upper portion of FIG. 7, it is assumed that, after the end of the voice section, the line of sight of the user may possibly move due to being lured by the output direction of the text even before completion of an output of the text.

Thus, in a case in which a voice section is not detected and an output of the text is not completed, if the moving direction of the output direction of the text substantially matches the moving direction of the line of sight of the user, the character representation deciding unit 135 according to the embodiment may fix the applying character representation. The character representation deciding unit 135 according to the embodiment can calculate the moving direction of a line of sight based on a change in position of the line of sight in time series recognized by the line-of-sight recognizing unit 260. Furthermore, the moving direction of the line of sight may also be calculated by the line-of-sight recognizing unit 260.

With the control described above performed by the character representation deciding unit 135 according to the embodiment, it is possible to prevent erroneous decision of character representation unintended by the user. Furthermore, the character representation deciding unit 135 may also fix the applying character representation until an output of the text is completed regardless of the output direction of the text and the moving direction of the line of sight.

Furthermore, the decided character representation may be reset when, for example, a period of detection time of the silent section continues more than a predetermined period of time after the completion of the output of the text. After the completion of the speech, for example, as illustrated in the lower portion of FIG. 7, a little time is expected due to the user considering a speech that is next to be given. Thus, the character representation deciding unit 135 according to the embodiment may reset the applying character representation based on the state in which a period of detection time of the silent section continues more than the predetermined time after the completion of the output of the text.

Furthermore, at this time, the display control unit 130 resets a highlighting expression of the character representation icon TI associated with the applying character representation. In a case of the example illustrated in FIG. 7, the display control unit 130 returns the display mode of the character representation icon TI1 to a normal state, i.e., an unselected state. In contrast, the applied character representation may also be internally held.

Furthermore, as described above, after the reset of the character representation, as illustrated in the upper portion of FIG. 8, if the user recalls the content of the speech to be given, the user can select the intended character representation by again moving the line of sight to the arbitrary character representation icon TI as illustrated in the lower portion of the drawing. Furthermore, at this time, there is a possibility that the user does not remember the character representation selected before.

In a case of the example illustrated in FIG. 8, in a situation in which a voice section is not detected, the character representation deciding unit 135 applies the character type "Arabic numeric character" to speech-to-text conversion of the subsequent voice section based on the state in which the line of sight of the user stayed at the character representation icon TI4 more than the threshold time. Furthermore, the display control unit 130 highlights the associated character representation icon TI4 based on the state in which the character type "Arabic numeric character" has been decided to be applied.

Figure 9:
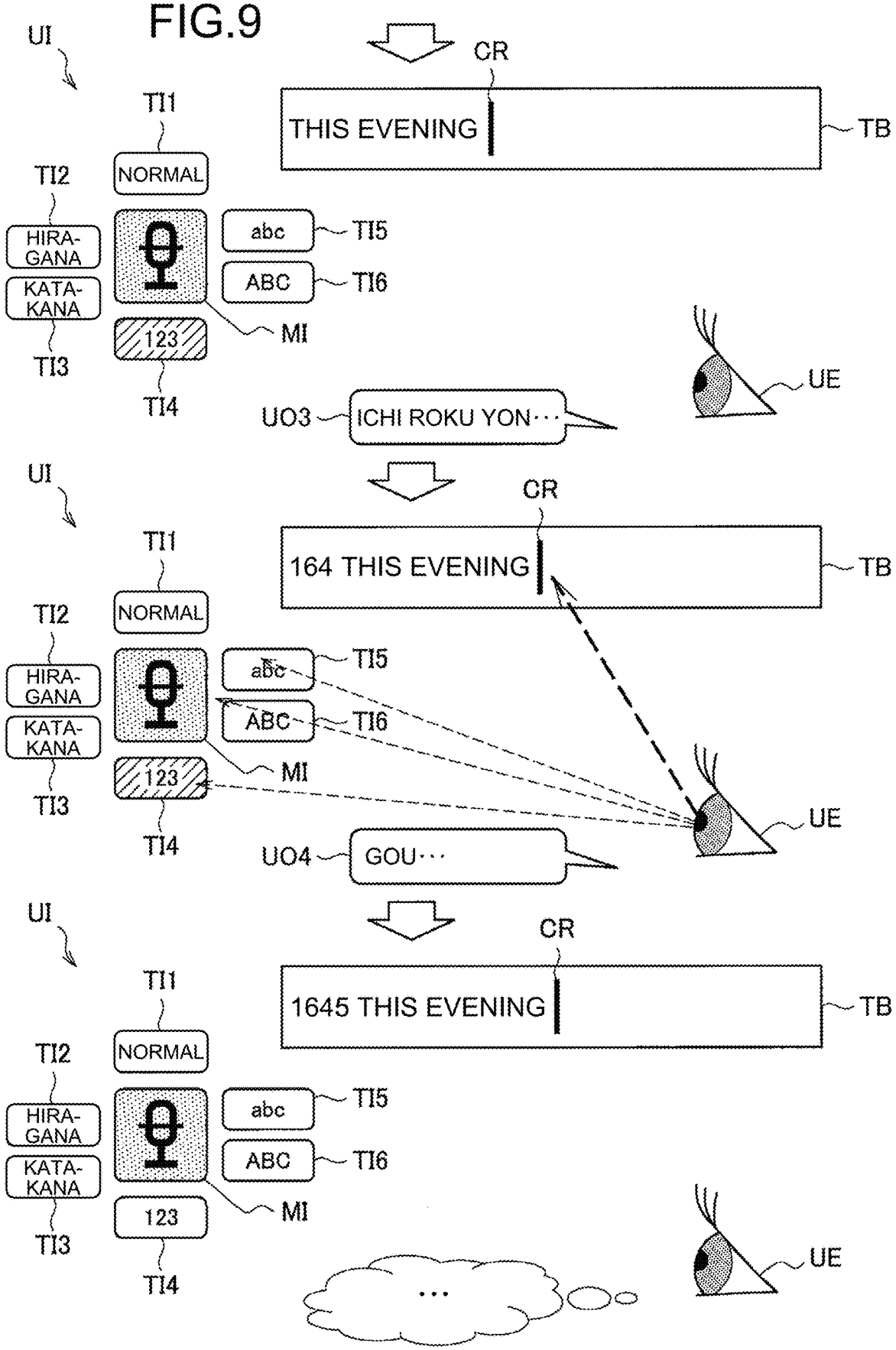
FIG. 9 is a diagram illustrating the flow of character representation decision according to the embodiment.

Subsequently, as illustrated in the upper portion of FIG. 9, when the user gives a speech UO3, a text is output by using the character type "Arabic numeric character" that has been decided to be applied by the character representation deciding unit 135. At this time, it is assumed that the line of sight of the user moves in accordance with the output of the text; however, as described above, the character representation deciding unit 135 may fix the applying character representation regardless of the position of the line of sight of the user.

Furthermore, in a description below, the processes having the same content as that described by using FIG. 5 to FIG. 8 may also be repeatedly performed.

In the following, prediction of character representation according to the embodiment will be described. As described above, the character representation predicting unit 140 according to the embodiment has a function for predicting, based on a tendency of a character input of a user learned by the character representation learning unit 145, character representation related to speech-to-text conversion of a verbal action performed by the user.

FIG. 10 to FIG. 12 are diagrams each illustrating prediction of character representation according to the embodiment. First, as illustrated in the upper portion of FIG. 10, when an arbitrary character representation icon is fixedly stared by the user and a speech UO5 is given, an output of the text based on the character representation decided by the character representation deciding unit 135 is performed.

At this time, the character representation predicting unit 140 according to the embodiment predicts, based on the output text "this evening" and based on an input tendency of the user learned by the character representation learning unit 145, character representation having a high tendency to be subsequently selected by the user.

For example, in a case of the example illustrated in FIG. 11, if it is highly likely to perform an input by using an "Arabic numeric character" after the word of "evening" that indicates the time zone based on the result of learning obtained by the character representation learning unit 145, the character representation predicting unit 140 according to the embodiment can predict the character type "Arabic numeric character" as the character type that is selected by the user next time.

In this case, as illustrated in the upper portion of FIG. 11, the display control unit 130 according to the embodiment may display a prediction icon PI indicating that the character type "Arabic numeric character" has been predicted in the vicinity of the position of the line of sight of the user at that time.

Here, when the character representation predicted by the character representation learning unit 145 is approved by the user, the character representation deciding unit 135 according to the embodiment applies the subject character representation to the speech-to-text conversion of the subsequent voice section.

The character representation deciding unit 135 may also recognize, as illustrated in, for example, the lower portion of FIG. 11, that the user has approved the predicted character representation based on the state in which the user fixedly stares the prediction icon PI more than the threshold time. Furthermore, the approval performed by the user is not limited to this example and can be performed by using various method. The user may give an approval by using a speech of, for example, "yes" or the like, or may give an approval by making a gesture of nodding, by pressing a button, or the like.

Furthermore, if the character representation deciding unit 135 assumes that the user has approved the predicted character representation, the character representation deciding unit 135 decides the associated character representation to apply the speech-to-text conversion of the subsequent voice section, and the display control unit 130 highlights the prediction icon PI based on the decision performed by the character representation deciding unit 135.

After this, as illustrated in the upper portion of FIG. 12, when the user gives a speech UO6, as illustrated in the lower portion of the drawing, an output of the text by using the character representation that is decided to be applied by the character representation deciding unit 135 is performed.

In the above, a function for predicting character representation performed based on an input tendency of the user according to the embodiment has been described. According to the function, because the character representation predicted based on the input tendency of the user is displayed in the vicinity of the fixedly staring point, it is possible to reduce a burden of spontaneously and fixedly staring the character representation icon TI each time of a speech and it is thus possible to improve convenience.

Subsequently, a process in a case in which the character input interface UI according to the embodiment is used by a plurality of users will be described. In the above descriptions by using FIG. 5 to FIG. 12, the description has been given of a case in which the information processing terminal 10 according to the embodiment is a device, such as a head-mounted display, and is used by a single user.

Figure 13:
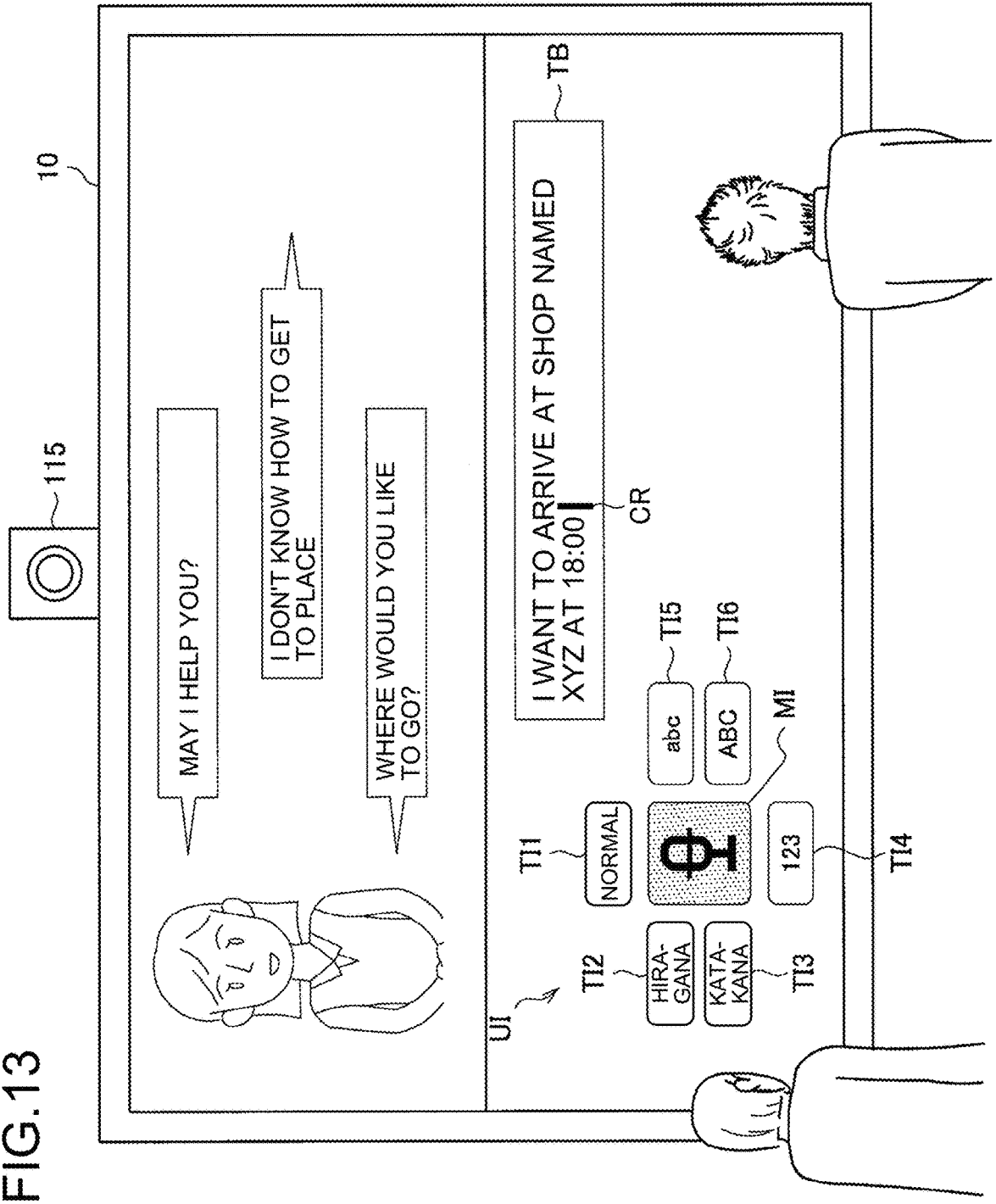
FIG. 13 is a diagram illustrating a usage example in a case in which the information processing terminal 10 according to the embodiment is a digital signage terminal.

In contrast, the information processing terminal 10 according to the embodiment may also be a device, such as a digital signage terminal, that is presumed to be used by a plurality of users. FIG. 13 is a diagram illustrating a usage example in a case in which the information processing terminal 10 according to the embodiment is a digital signage terminal.

FIG. 10 illustrates an example in a case in which the information processing terminal 10 is a digital signage terminal providing information to many and unspecified users while conducting dialogues using voices.

In this case, the information processing terminal 10 may transmit images captured by the image capturing unit 115 and speeches given by the users collected by the voice input unit 110 (not illustrated) to the information processing server 20 and may receive information from the identified speaker. The speaker identifying unit 240 in the information processing server 20 can comprehensively identify a speaker based on the result of face recognition, the result of lip recognition, or the direction of the sound source presumed by the sound source direction presuming unit 230.

Furthermore, on the display unit 150 in the information processing terminal 10, for example, as illustrated in the drawing, a dialogue history with the system and the character input interface CI is displayed. The plurality of users can use the character input interface CI and input a character input performed by a speech while designating the character representation.

At this time, the character representation deciding unit 135 according to the embodiment may decide, based on the lines of sight of the plurality of users and the speeches, character representation related to speech-to-text conversion of the speech for each user. The information processing terminal 10 according to the embodiment can exclusively or simultaneously process the character inputs given by the plurality of users.

Figure 14:
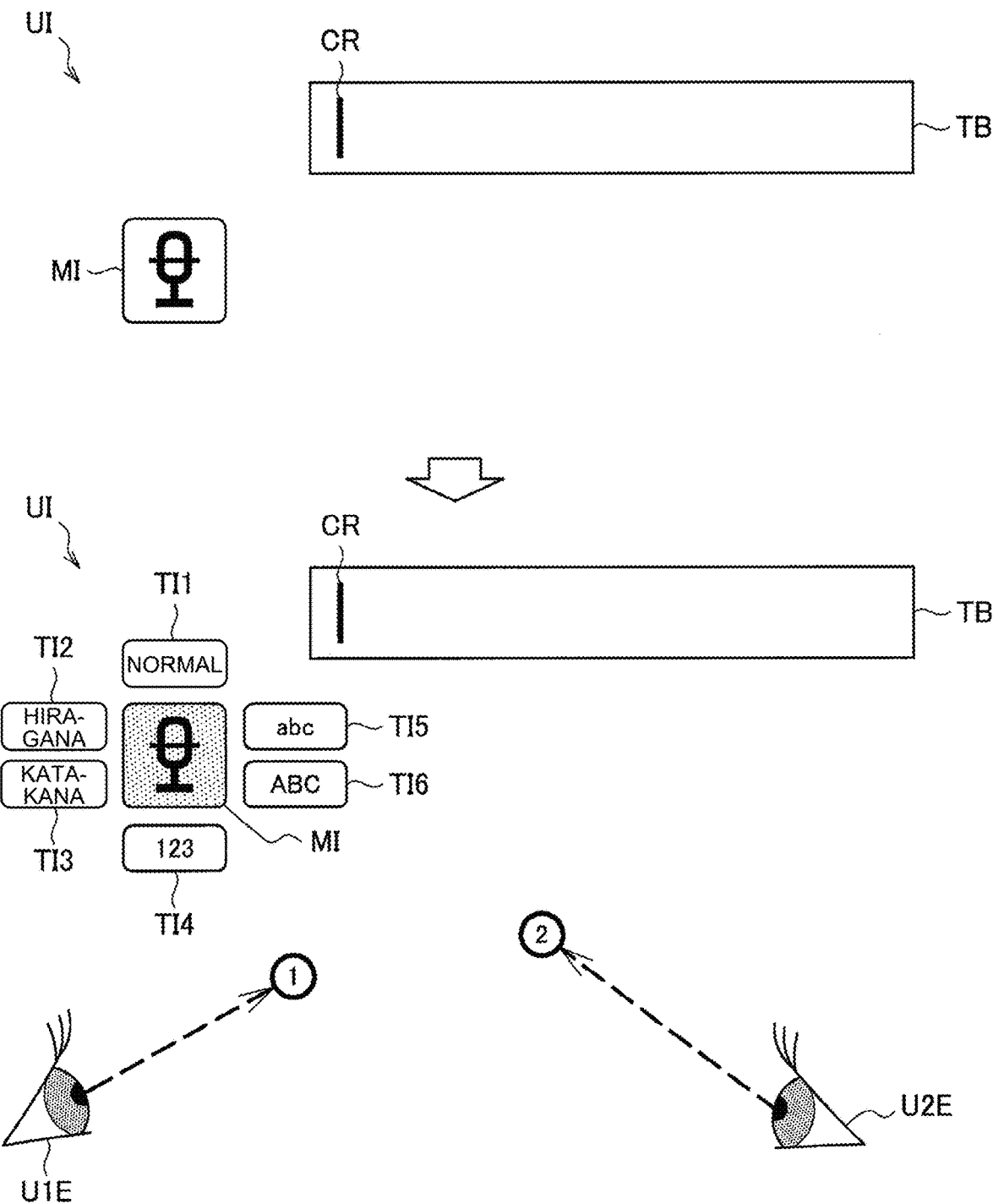
FIG. 14 is a diagram illustrating the flow in a case in which the information processing terminal 10 according to the embodiment exclusively controls character inputs received from a plurality of users.
Figure 15:
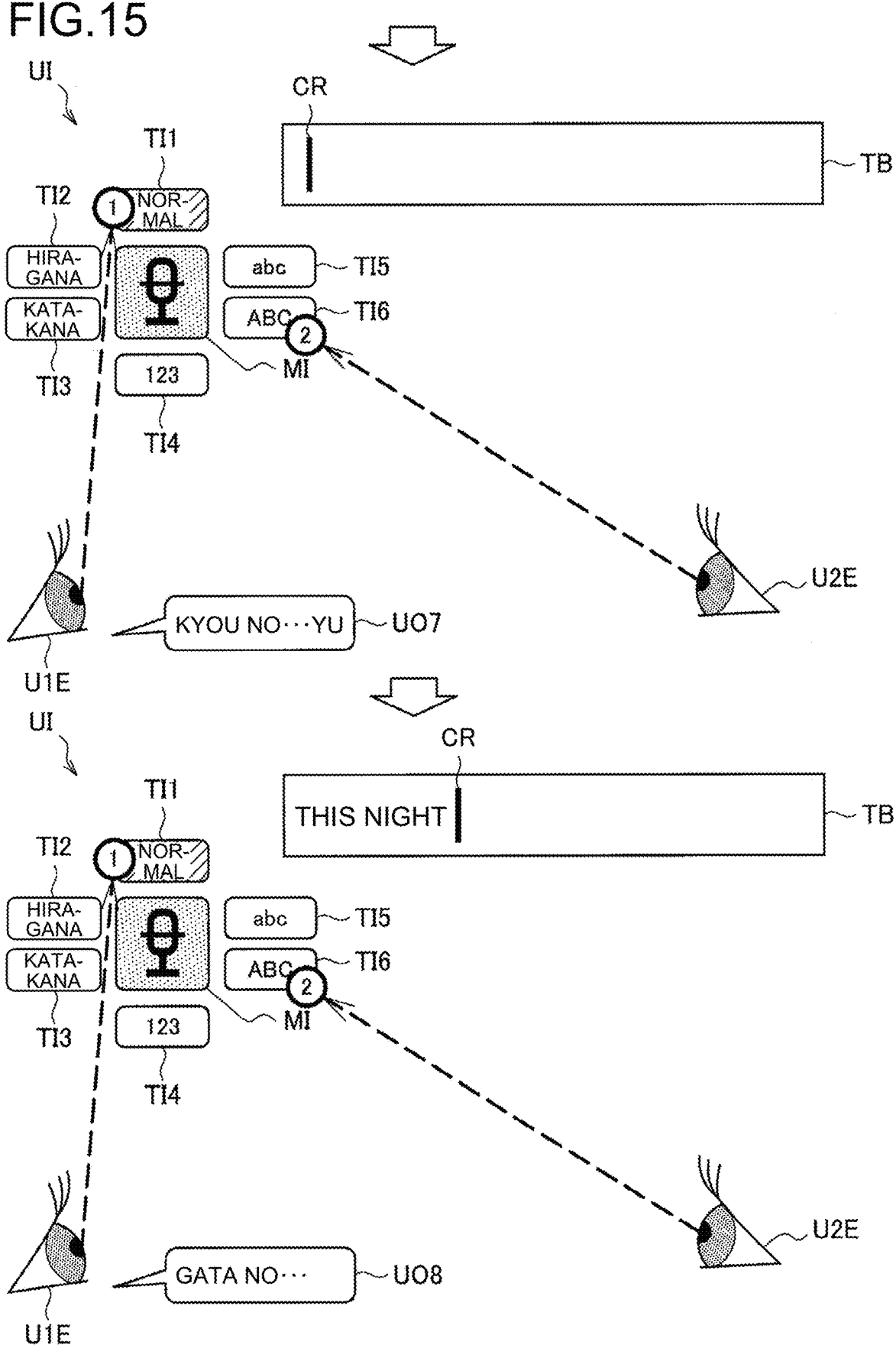
FIG. 15 is a diagram illustrating the flow in a case in which the information processing terminal 10 according to the embodiment exclusively controls character inputs received from a plurality of users.
Figure 16:
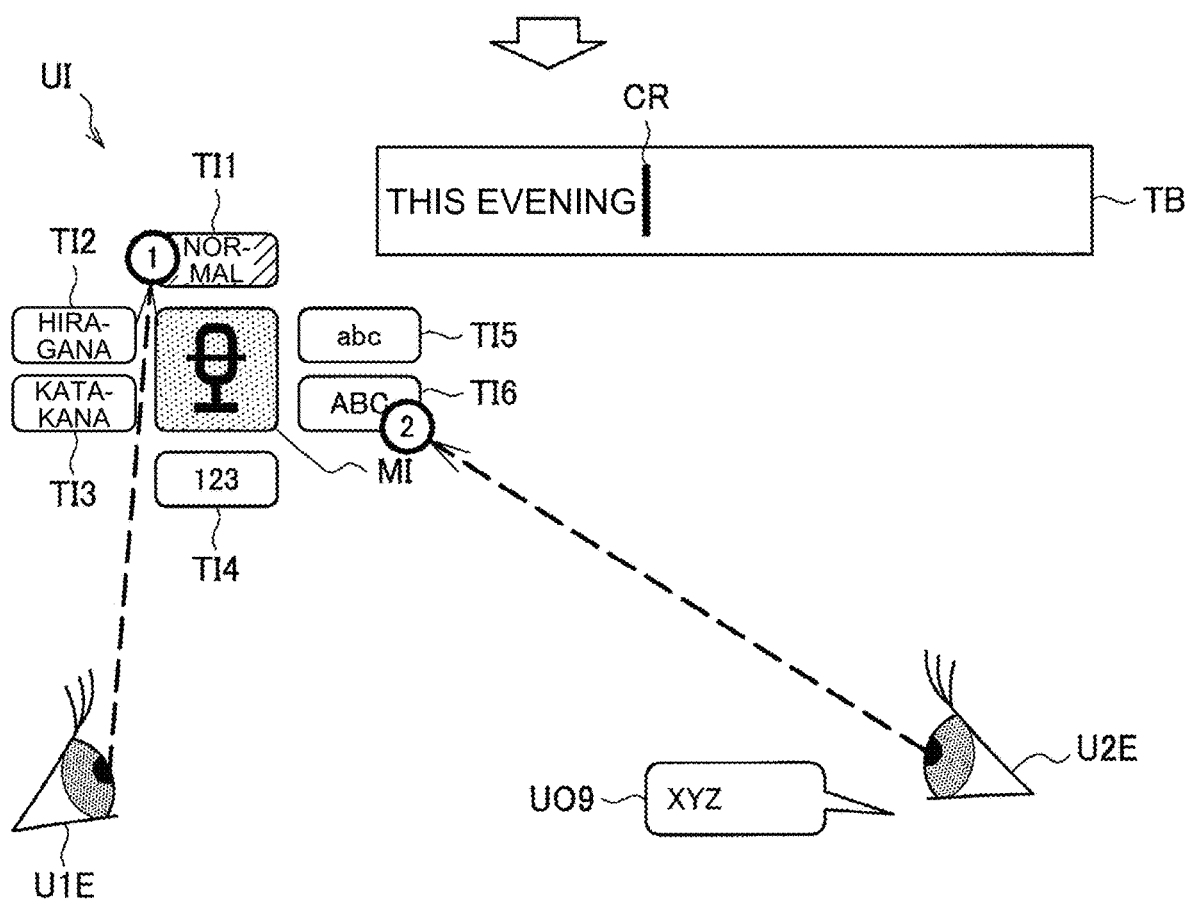
FIG. 16 is a diagram illustrating the flow in a case in which the information processing terminal 10 according to the embodiment exclusively controls character inputs received from a plurality of users.

FIG. 14 to FIG. 16 are diagrams each illustrating the flow in a case in which the information processing terminal 10 according to the embodiment exclusively controls character inputs received from a plurality of users. For example, if a single text box TB from which a text is output is provided, the information processing terminal 10 may exclusively control the character inputs received from the plurality of users.

First, when a start of voice input is designated by one of the users, as illustrated in FIG. 14, the display control unit 130 highlights the microphone icon IC and the line-of-sight recognizing unit 260 starts tracking a line of sight for each user. Furthermore, here, it is assumed a case in which two users U1 and U2 are present. In the drawing, an eyeball U1E of the user U1 and an eyeball U2RE of a user U2 are schematically illustrated in addition to the line of sight of each of the users indicated by the broken line.

Furthermore, if a plurality of users are present, the display control unit 130 may display, by a pointer as illustrated in the drawing, the position of the line of sight detected for each user. According to this function, each of the users can clearly grasp the position of the own line of sight and can select the arbitrary character representation icon TI without confusing the character representation icon TI selected by the other user.

Here, if each of the users U1 and U2 fixedly stares the character representation icon TI, the display control unit 130 highlights each of the selected character representation icons TI.

However, here, as illustrated in the upper portion of FIG. 15, if a speech given by one of the users is detected, the character representation deciding unit 135 according to the embodiment may apply only the character representation associated with the character representation icon TI that is fixedly stared by the user who has given the speech to the speech-to-text conversion of the subsequent voice section. Furthermore, at this time, the character representation deciding unit 135 according to the embodiment does not need to control the character representation based on the line of sight of the other user.

For example, in a case of the example illustrated in FIG. 15, the character representation deciding unit 135 applies, based on the state in which the user U1 has given a speech UO7, the character type "normal" associated with the character representation icon TI1 that is fixedly stared by the user U1 to the speech-to-text conversion of the subsequent voice section and discards the information on the character type "Latin character in uppercase character" associated with the character representation icon TI6 that is fixedly stared by the user U2.

Furthermore, at this time, in response to the control performed by the character representation deciding unit 135 described above, the display control unit 130 according to the embodiment may reset the highlight of the character representation icon TI6 that is fixedly stared by the user U2.

Furthermore, the display control unit 130 may also indicate that the designation of the character representation becomes invalid by changing the color of the character representation icon TI6.

After this, the text associated with a speech UO7 or UO8 given by the user U1 is output to the text box TB based on the character type "normal" that has been decided to be applied by the character representation deciding unit 135.

At this time, for example, as illustrated in FIG. 16, even when a speech UO9 has been given by the user U2, the text associated with the speech given by the user U2 is not output to the text box TB until the input performed by the user U1 is completed (however, the text may also be internally subjected to a voice recognition process). With the series of control performed by the information processing terminal 10 according to the embodiment, even when a plurality of users are present, it is possible to perform the process for each user without confusing designation of speeches or character representation.

Figure 17:
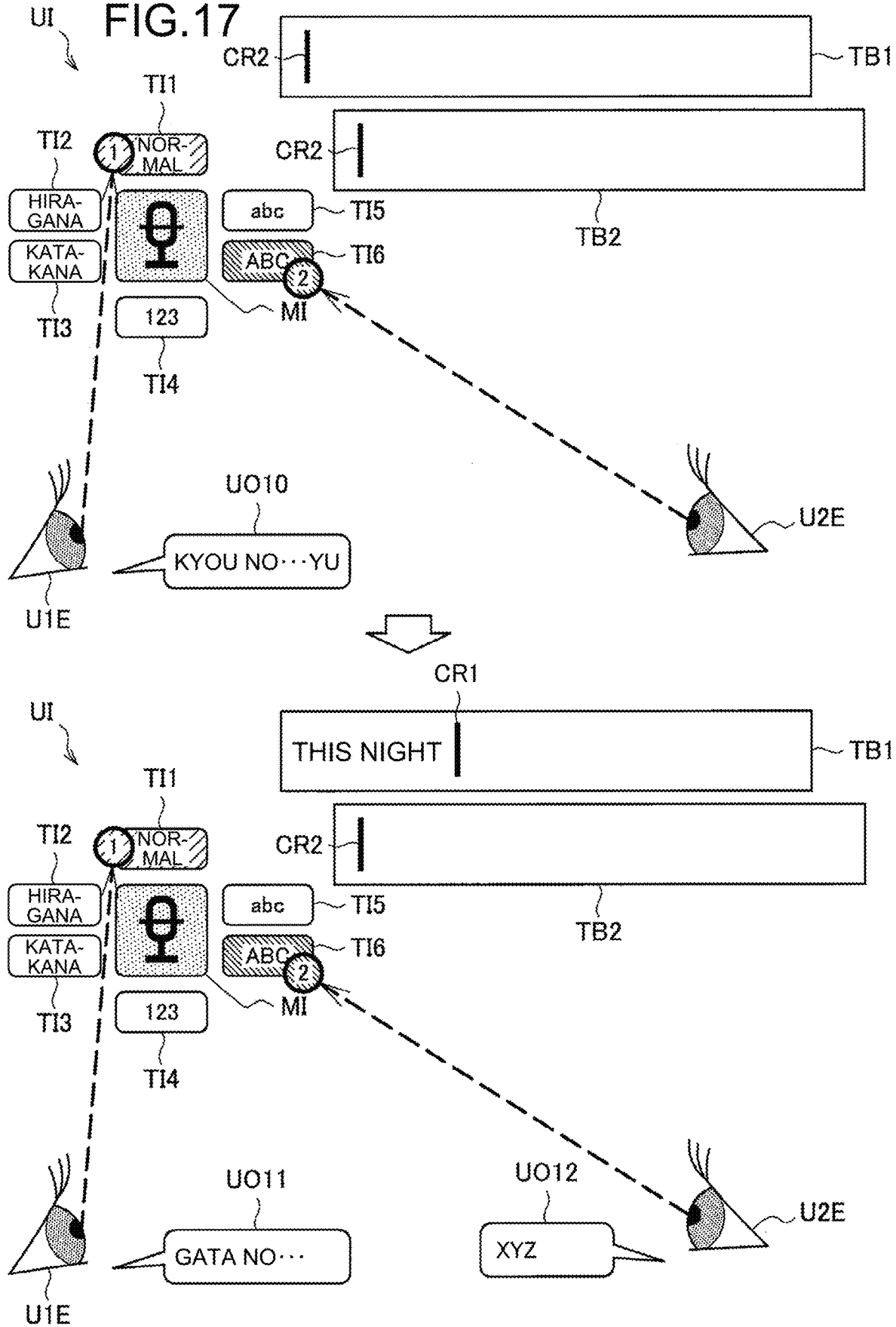
FIG. 17 is a diagram illustrating the flow in a case in which the information processing terminal 10 according to the embodiment simultaneously controls character inputs received from a plurality of users.

Subsequently, a description will be given of a case in which the information processing terminal 10 according to the embodiment simultaneously control character inputs given by the plurality of user. FIG. 17 to FIG. 19 are diagrams each illustrating the flow in a case in which the information processing terminal 10 according to the embodiment simultaneously controls character inputs received from a plurality of users.

In a case of the examples illustrated in FIG. 17 to FIG. 19, unlike the examples illustrated in FIG. 14 to FIG. 16, the number of text boxes TB corresponding to the number of detected users may be displayed. In the case of the examples illustrated in FIG. 17 to FIG. 19, the text box T1 and the caret CR1, and the text box T2 and the caret CR2 are displayed based on detection of the users U1 and U2.

In this case, the character representation deciding unit 135 according to the embodiment can simultaneously control the character representation related to speech-to-text conversion for each speech given by the user based on the lines of sight of the plurality of users and the speeches given by the users.

For example, in the upper portion of FIG. 17, the user U1 fixedly stares a character representation icon TI1 and the user U2 fixedly stares the character representation icon TI6. At this time, the character representation deciding unit 135 according to the embodiment applies the character type "normal" to speech-to-text conversion of the subsequent speech given by the user U1 and applies the character type "uppercase Latin characters" to the subsequent speech given by the user U2.

Furthermore, in response to the above described control performed by the character representation deciding unit 135, the display control unit 130 highlights each of the character representation icons TI1 and TI6 in a different display mode. According to this control, each of the users U1 and U2 can intuitively grasp that state in which designation of the own character representation is valid.

In this state, as illustrated in FIG. 17, the users U1 and U2 give the speeches UO10 and UO12, respectively, as illustrated in the lower portion of FIG. 17 and in the upper portion of FIG. 18, the texts associated with the speeches given by the respective users are output to the text boxes T1 and T2 by the applying character types. At this time, by using the presumed result obtained by the sound source direction presuming unit 230 and by using a beamforming technology, the voice recognizing unit 210 can separately recognize the speeches given by the users U1 and U2.

After this, the information processing terminal 10 repeatedly performs the process described above based on the positions of the lines of sight of the users U1 and U2 and the speeches. For example, in the lower portion of FIG. 18, the line of sight of the user U1 is away from the character representation icon TI1 and the line of sight of the user U2 moves to the character representation icon TI1. At this time, the character representation deciding unit 135 resets designation of the character type related to the user U1 and changes designation of the character type related to the user U2 to the character type "normal".

Here, as illustrated in the upper portion of FIG. 19, if the line of sight of the user U1 stays at the character representation icon TI4, the character representation deciding unit 135 changes the designation of the character type related to the user U1 to the character type "Arabic numeric character". After this, a speech UO13 given by the user U2 or a speech UO14 given by the user U1 is displayed by the text with the decided character type described above.

In the above, control of the character representation performed based on a line of sight of the user according to the embodiment has been described. With the above described control performed by the information processing terminal 10 according to the embodiment, it is possible to dynamically change the character representation in the middle of the process of inputting a voice and it is thus possible to obtain character string intended by the user without separately setting an input mode each time.

Furthermore, with the above described control performed by the information processing terminal 10 according to the embodiment, by fixing the character representation for each voice section, it is possible to easily select arbitrary character representation only by an action of fixedly staring the character representation icon TI for a short time without imposing the burden of continuously looking at a single point. Furthermore, even when fluctuations occur in the position of a line of sight at the time of output of a text, it is possible to control the character representation in accordance with a natural movement of the user's eyes and a speech without being affect by the fluctuations.

Furthermore, in the description above, the description has been given by using a character type as an example of the character representation according to the embodiment; however, the character representation according to the embodiment is not limited to the example. As described above, the character representation according to the embodiment widely includes various kinds of representation related to the visual effect of a text. The character representation according to the embodiment may also include, for example, typefaces, character decorations, punctuation marks, notation languages, and the like.

FIG. 20 is a diagram illustrating an example of control of a typeface performed based on a line of sight of the user according to the embodiment. In the case of the example illustrated in FIG. 20, a different typeface (font type) is associated with each of the character representation icons TI1 to TI6.

For example, in the upper portion of FIG. 20, the user gives a speech UO15 by fixedly staring the character representation icon TI6. At this time, the typeface "cursive style" associated with the character representation icon TI6 is applied to the subsequent speech-to-text conversion by the character representation deciding unit 135 and the text expressed by the typeface "cursive style" is output to the text box TB.

Furthermore, in the lower portion of FIG. 20, the user gives a speech UO16 by fixedly staring the character representation icon TI4. Here, the character representation icon TI4 may be an icon associated with an emoticon (emoji). At this time, the typeface "emoticon" associated with the character representation icon TI4 is applied to the subsequent speech-to-text conversion by the character representation deciding unit 135 and the text expressed by the typeface "emoticon" is output to the text box TB. Furthermore, in the case of the example illustrated in the lower portion of FIG. 20, the user gives a speech of "smile"; however, here, a text ":)" is output in accordance with the selected typeface "emoticon". In this way, in the embodiment, conversion of the text may be performed based on the setting defined for each typeface.

In the above, control of the typeface performed based on a line of sight of the user according to the embodiment has been described with specific examples. In this way, according to the information processing terminal 10 according to the embodiment, it is possible to control, in addition to the character types, various kinds of visual representation, such as typefaces of a text and character decorations.

According to the function held by the information processing terminal 10 according to the embodiment, the user can easily change visual representation of a text by using the line of sight and it is thus possible to fully represent the text obtained by a voice input. Furthermore, the character decorations described above includes, for example, effects of the color, the size, various kinds of designs, flashing of a text, and the like.

Subsequently, a description will be given of an example of control of a punctuation mark performed based on a line of sight of the user according to the embodiment. Here, the punctuation mark is a general term of description sign used to description of languages. Examples of the punctuation marks includes, for example, punctuation, a question mark, an exclamation mark, parentheses, an accent, and the like.

FIG. 21 is a diagram illustrating an example of control of a punctuation mark performed based on a line of sight of the user according to the embodiment. In the case of the example illustrated in FIG. 21, the character type "normal" is associated with the character representation icon TI1 and a set of different parentheses is associated with each of the character representation icons TI2 to TI6.

For example, in the upper portion of FIG. 21, the user gives a speech UO17 by fixedly staring the character representation icon TI1. At this time, the character type "normal" associated with the character representation icon TI1 is applied to the subsequent speech-to-text conversion by the character representation deciding unit 135 and the text expressed by the character type "normal" is output to the text box TB.

Furthermore, in the lower portion of FIG. 20, the user gives a speech UO18 by fixedly staring the character representation icon TI2. At this time, the punctuation mark " " associated with the character representation icon TI1 is applied to the subsequent speech-to-text conversion by the character representation deciding unit 135 and the text surrounded by the punctuation mark " " is output to the text box TB.

In the above, the description has been given of control of punctuation marks performed based on a line of sight of the user according to the embodiment. In this way, according to the information processing terminal 10 according to the embodiment, it is possible to easily apply punctuation marks, such as parentheses, to a text based on a line of sight. According to the above described function held by the information processing terminal 10 according to the embodiment, there is no need to give a speech or the like for inputting a punctuation mark, which makes it possible to greatly improve convenience.

In the following, an example of control of a notation language performed based on a line of sight of the user according to the embodiment will be described. Here, the notation language indicates various kinds of languages, such as English, Japanese, and French languages, that are used to be written in a text.

FIG. 22 is a diagram illustrating an example of control of notation languages performed based on a line of sight of the user according to the embodiment. In the case of the example illustrated in FIG. 22, a different notation language is associated with each of the character representation icons TI1 to TI4.

For example, in the upper portion of FIG. 22, in the state in which the text "What does" written in English is displayed in the text box TB, the user gives the speech UO17 "ohayou" by fixedly staring the character representation icon TI3. At this time, the notation language "Japanese" associated with the character representation icon TI3 is applied to the subsequent speech-to-text conversion by the character representation deciding unit 135 and, as illustrated in the lower portion of the drawing, the text "ohayou" in written language "Japanese" is output to the text box TB.

Subsequently, the user can input a piece of writing in which English notation and Japanese notation are present in a mixed manner by giving a speech UO20 or the like while fixedly staring, for example, the character representation icon TI1.

In the above, control of punctuation marks performed based on the line of sight of the user according to the embodiment has been described by using the specific example. In this way, according to the information processing terminal 10 according to the embodiment, it is easily select a notation language for a text based on a line of sight and it is thus possible to greatly reduce a burden imposed on, for example, a user who daily uses a plurality of languages or switching languages performed by a user who is learning a foreign language.

Furthermore, in FIG. 22, the description has been given of the case in which the character representation deciding unit 135 controls only the language that is used to be written in a text based on the line of sight of the user; however, designation of the language performed based on the line of sight of the user may also be applied to, for example, translation or the like.

Figure 23:
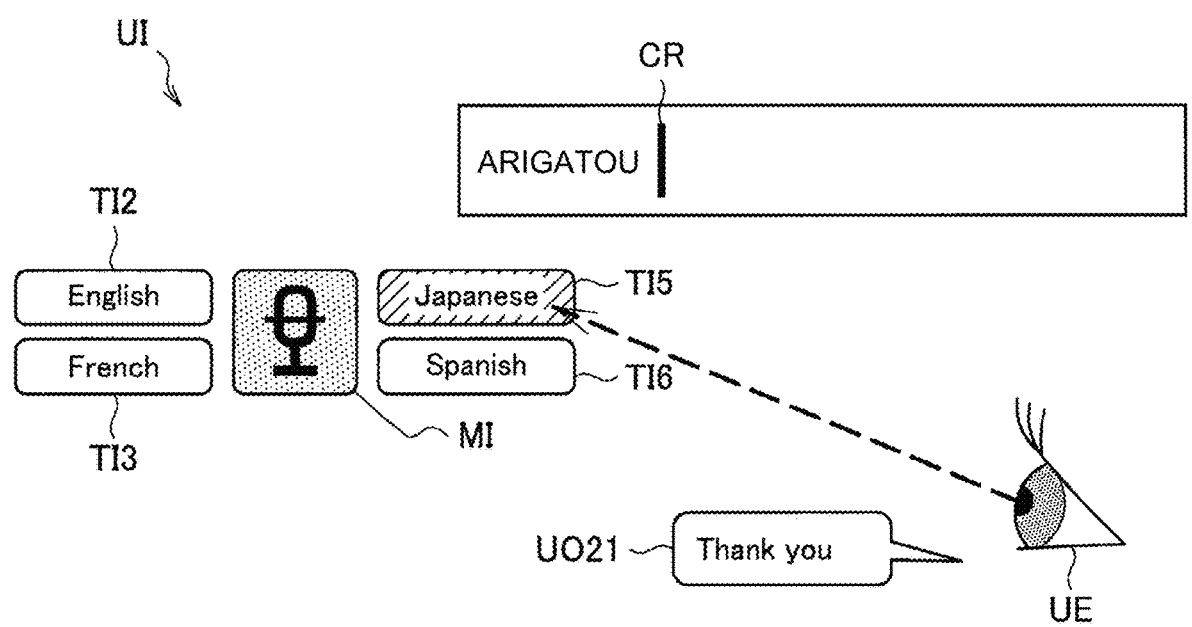
FIG. 23 is a diagram illustrating an example of control of a translation target language based on a line of sight of a user according to the embodiment.

FIG. 23 is a diagram illustrating an example of control of a translation target language performed based on a line of sight of a user according to the embodiment. In the example illustrated in FIG. 23, similarly to the case illustrated in FIG. 22, a different language is associated with each of the character representation icons TI1 to TI4.

Here, for example, when the user gives the speech UO17 "Thank you" by fixedly staring the character representation icon TI3, the character representation deciding unit 135 performs control such that the translation target language "Japanese" associated with the character representation icon TI3 is applied to translation of the text after voice recognition. According to this control, it is possible to easily acquire sentences translated into various languages based on the line of sight.

In the above, the description has been given of an example of character representation according to the embodiment. Subsequently, a modification related to control of the character representation performed based on a line of sight according to the embodiment will be described.

In the above description, the description has been given of the case in which the character representation deciding unit 135 according to the embodiment control speech-to-text conversion of a subsequent voice section performed based on the character representation icon TI that has been fixedly stared by the user; however, designation of the character representation performed based on a line of sight according to the embodiment may also be performed, in an ex-post facto manner, after a text has been output.

FIG. 24 is a diagram illustrating post-designation of character representation performed by a line of sight according to the embodiment. The upper portion of FIG. 24 illustrates the state in which, when the user gives a speech UO22 by fixedly staring the character representation icon TI2, the text based on the character type "hiragana" associated with the character representation icon TI2 is output to the text box TB.

At this time, the user can also change the character representation related to the already input text by fixedly staring the arbitrary character representation icon TI1 until a confirmation process is performed on the input text.

For example, in the example illustrated in the lower portion of FIG. 24, the user fixedly stares the character representation icon TI4 associated with the character type "Arabic numeric character". At this time, the character representation deciding unit 135 according to the embodiment performs control such that the character representation of the text is converted to the character type "Arabic numeric character" based on the character representation icon TI4 that is newly and fixedly stared after the end of the voice section associated with the speech UO22.

According to the above described control performed by the character representation deciding unit 135 according to the embodiment, the user can easily correct the character representation in the case where a text based on unintended character representation is output. Furthermore, the confirmation process described above may also be performed based on, for example, an elapse of predetermined time, pressing a button, a command received by a speech, or the like.

Subsequently, a description will be given of control of the character representation performed based on non-verbal action other than eye movements according to the embodiment. In the above description, the case in which the character representation deciding unit 135 controls the character representation based on a line of sight recognized from the eye movement of the user has been described as a main example. In contrast, the non-verbal action according to the embodiment is not limited to this example. The non-verbal action according to the embodiment may also be a gesture performed by using, for example, a finger, a hand, a head portion, and another region of body.

FIG. 25 to FIG. 28 are diagrams each illustrating control of character representation performed based on a gesture according to the embodiment. Here, a user who has a visual impairment designates character representation by a gesture.

Figure 25:
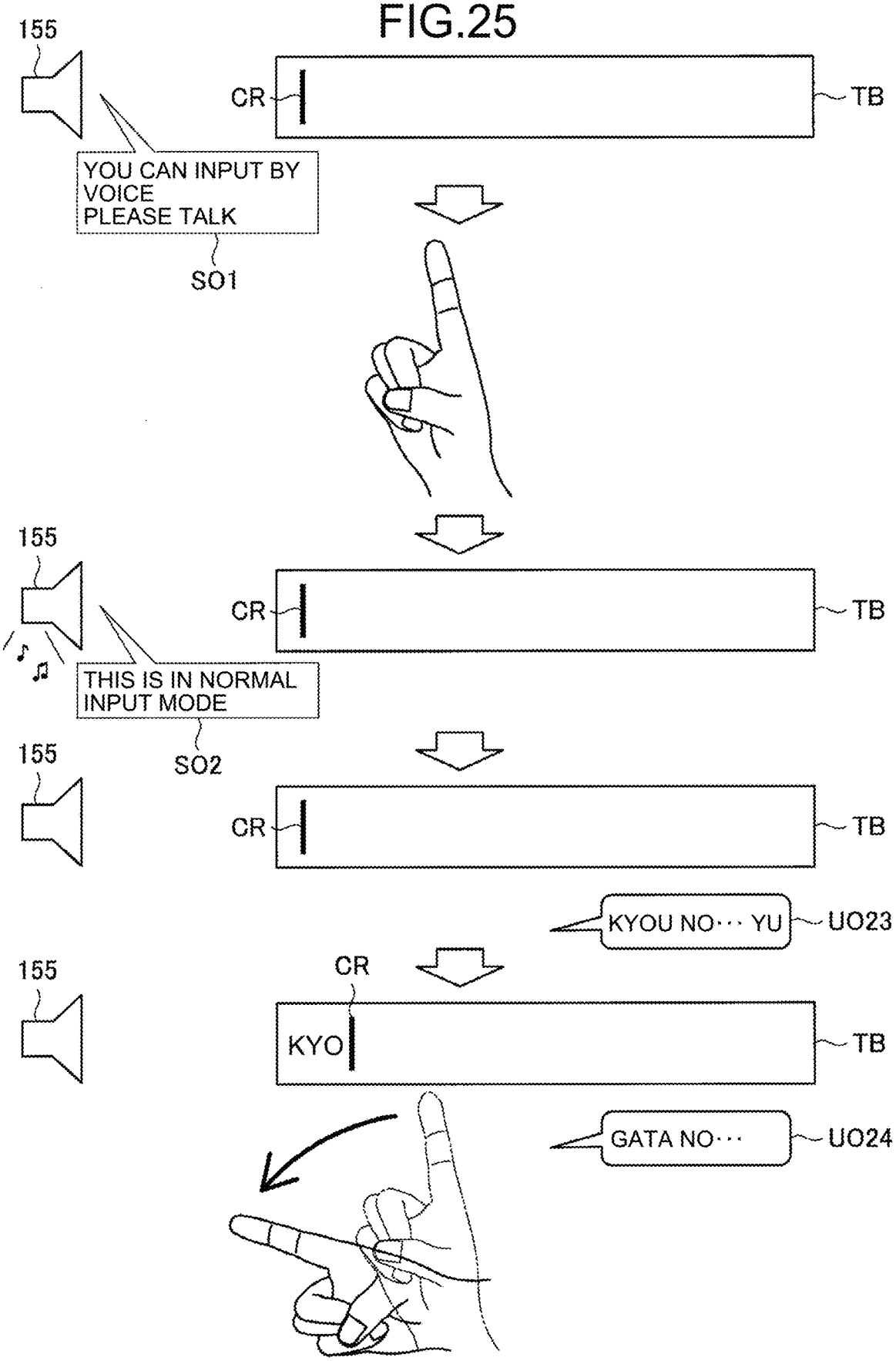
FIG. 25 is a diagram illustrating control of character representation based on gestures according to the embodiment.

In this case, first, as illustrated in FIG. 25, the sound output unit 155 in the information processing terminal 10 outputs a system speech SO1 indicating that a voice input is available and prompts the user to give a speech based on an input start designated by the user.

Then, the user designates character representation of a text by a previously defined gesture. In the example illustrated in FIG. 25, the user designates the character type "normal" by making a gesture indicating above by the forefinger.

At this time, the character representation deciding unit 135 according to the embodiment applies the character type "normal" to speech-to-text conversion of the subsequent voice section based on the state in which the gesture recognizing unit 270 has recognized the gesture described above. Furthermore, similarly to the control performed based on a line of sight, the character representation deciding unit 135 may fix the character type that has been decided to be applied.

Then, in response to the above described control performed by the character representation deciding unit 135, the sound output unit 155 outputs a system speech SO2 indicating that the character type "normal" has been applied.

Here, if the user gives a speech UO23, as illustrated in the lowest portion of the drawing, display of the text using the character type "normal" is started. At this time, similarly to the control performed based on a line of sight, it is assumed that fluctuations occurs in the gesture of the user; however, according to fixing the character representation for each voice section performed by the character representation deciding unit 135 according to the embodiment, it is possible to prevent a frequent change in character representation due to fluctuations in gesture.

Figure 26:
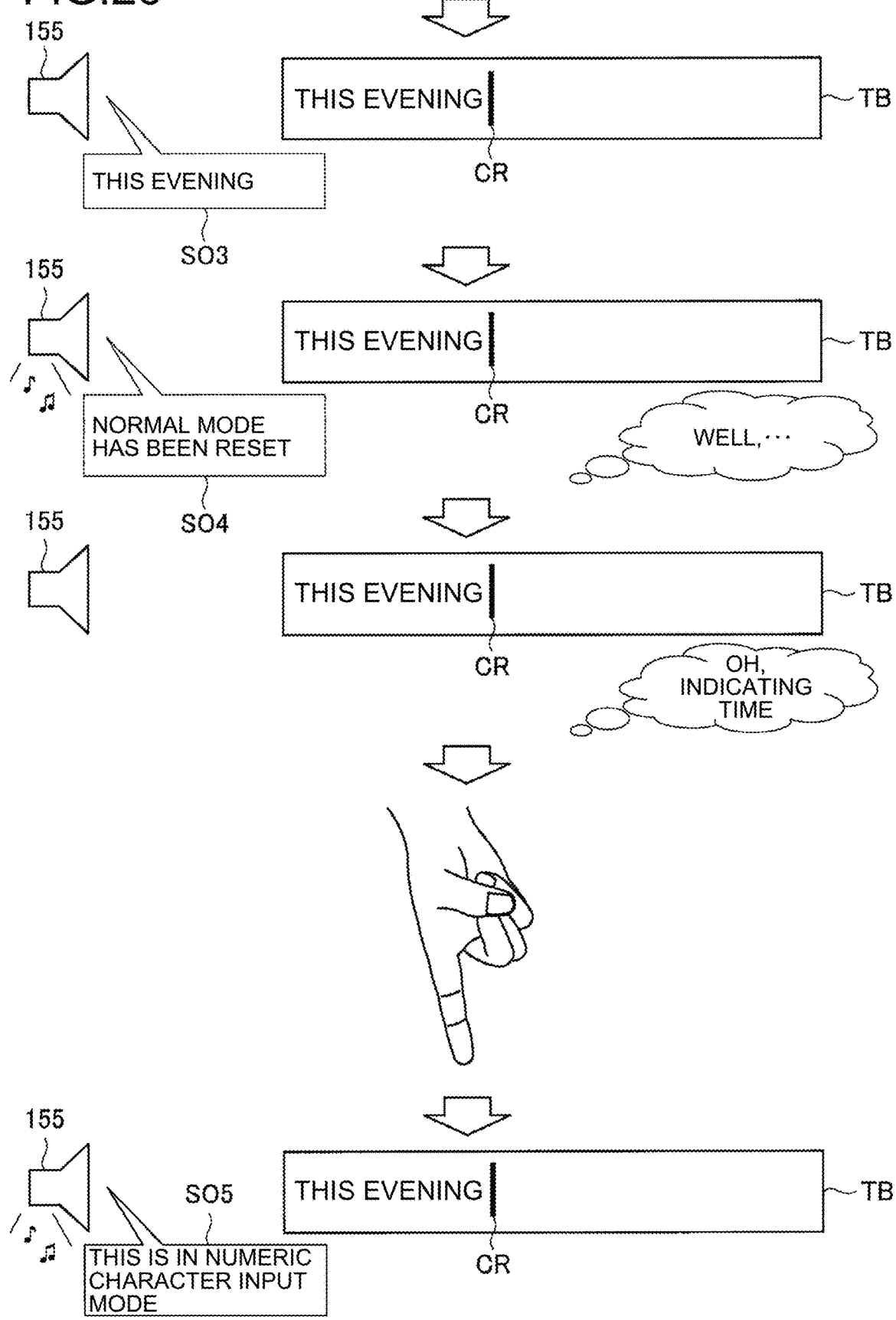
FIG. 26 is a diagram illustrating control of character representation based on gestures according to the embodiment.

Furthermore, as illustrated in the most upper portion of FIG. 26, when display of the text associated with the already input speech has been completed, the sound output unit 155 performs a task of reading text aloud, i.e., text to speech (TTS), of the displayed text by a system speech SO3.

At this time, the output mode of the system speech SO3 that is output by the sound output unit 155 may also be associated with the character representation that has been applied to the text. For example, in a case of the character type "normal", a female voice may also be used for TTS, and in a case of the character type "hiragana", a male voice may also be used for TTS.

Furthermore, the output mode of TTS in accordance with the character representation may also be changed by, for example, a pitch, a rate of a speech, an intonation, or the like. According to the control described above, even if a user has a visual impairment, it is possible for the user to judge the applied character representation by using TTS.

Furthermore, similarly to the control performed based on a line of sight, if a period of detection time of a silent section continues more than predetermined time, the character representation deciding unit 135 may reset the applying character representation. At this time, the sound output unit 155 outputs a system speech SO4 indicating that applying of the character representation has been reset.

After this, when a user recalls the content to be input next time and again makes a gesture for designating character representation, the character representation deciding unit 135 applies new character representation in accordance with the recognized gesture. In the example illustrated in FIG. 26, the character representation deciding unit 135 decides to apply the character type "Arabic numeric character" associated with the subject gesture based on the state in which the user has made the gesture indicating below by the forefinger. Furthermore, the sound output unit 155 outputs a system speech SO5 indicating that the character type "Arabic numeric character" has been designated.

Figure 27:
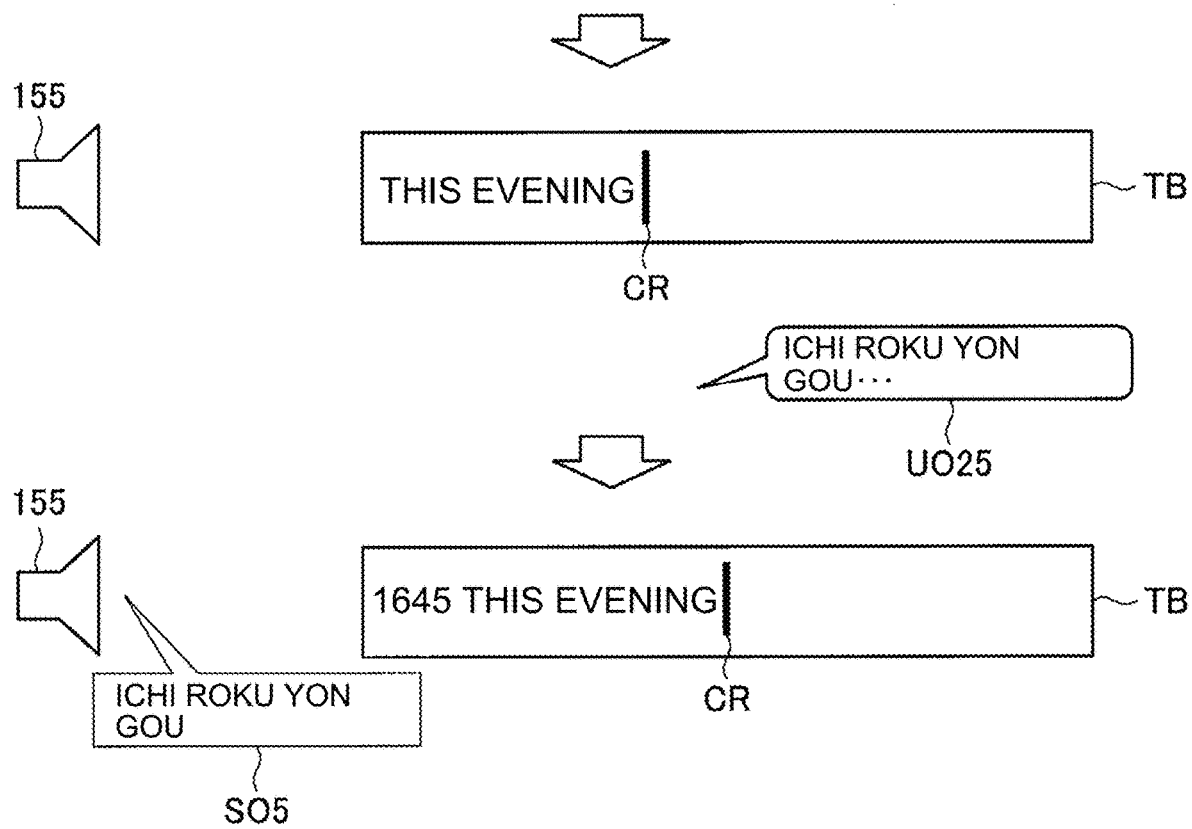
FIG. 27 is a diagram illustrating control of character representation based on gestures according to the embodiment.

Here, as illustrated in the upper portion of FIG. 27, when the user gives a speech UO25, a text is displayed by using the character type "Arabic numeric character", and the system speech SO5 associated with the text is output by the sound output unit 155. At this time, as described above, the system speech SO5 is output in the mode associated with the character type "Arabic numeric character".

As described above, the flow of the control of the character representation performed based on the gesture according to the embodiment has been described. Furthermore, even in the case of controlling the character representation by a gesture, similarly to the case of controlling performed by a line of sight, it may also be possible to predict the character representation based on a tendency of a character input received from a user.

Figure 28:
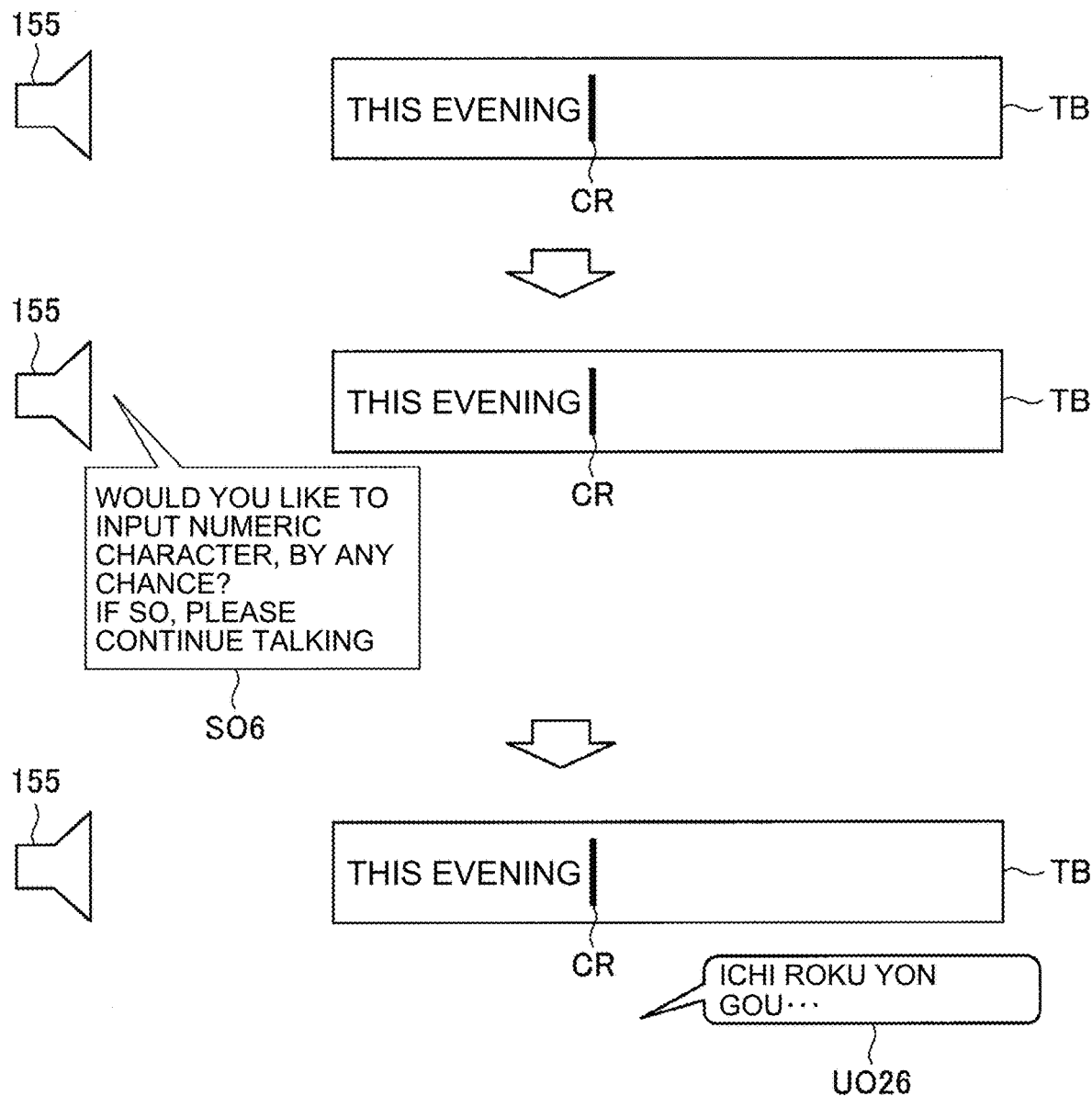
FIG. 28 is a diagram illustrating control of character representation based on gestures according to the embodiment.

FIG. 28 is a diagram illustrating prediction of character representation performed by control of the character representation based on gestures according to the embodiment. The upper portion of FIG. 28 illustrates the state in which the text of "this evening" based on a preceding speech given by a user is displayed on the text box TB.

At this time, the character representation predicting unit 140 according to the embodiment predicts, based on the displayed text "this evening" and the input tendency of the user learned by the character representation learning unit 145, the character representation that is highly likely to be subsequently selected by the user. Here, the character representation predicting unit 140 predicts the character type "Arabic numeric character" as the character type that is selected by the user next time.

In this case, the sound output unit 155 outputs a system speech SO6 indicating that the character type "Arabic numeric character" has been predicted as the next character type and indicating an instruction, in a case of approval, to continuously give a speech.

Here, if the user approves the character representation predicted by the character representation learning unit 145, i.e., if a speech UO26 is given subsequent to the system speech SO6, the character representation deciding unit 135 according to the embodiment applies the character representation to speech-to-text conversion of the subsequent voice section.

In the above, control of the character representation performed based on a line of sight, a gesture, and the like according to the embodiment has been described in detail. Furthermore, control of the character representation according to the embodiment is not limited to the examples described above and may also be performed by an operation using, for example, a speech mode (a pitch, an intonation, a rate of speech, etc.), a pre- or post-voice command, a controller, a button, a foot switch, or the like.

Furthermore, in the description above, the case in which the text box TB that displays the recognized text and the character representation icon TI that is used to designate the character representation are displayed on the same screen has been described as the main example. In contrast, the text box TB and the character representation icon TI according to the embodiment may also be output on different screens.

Figure 29:
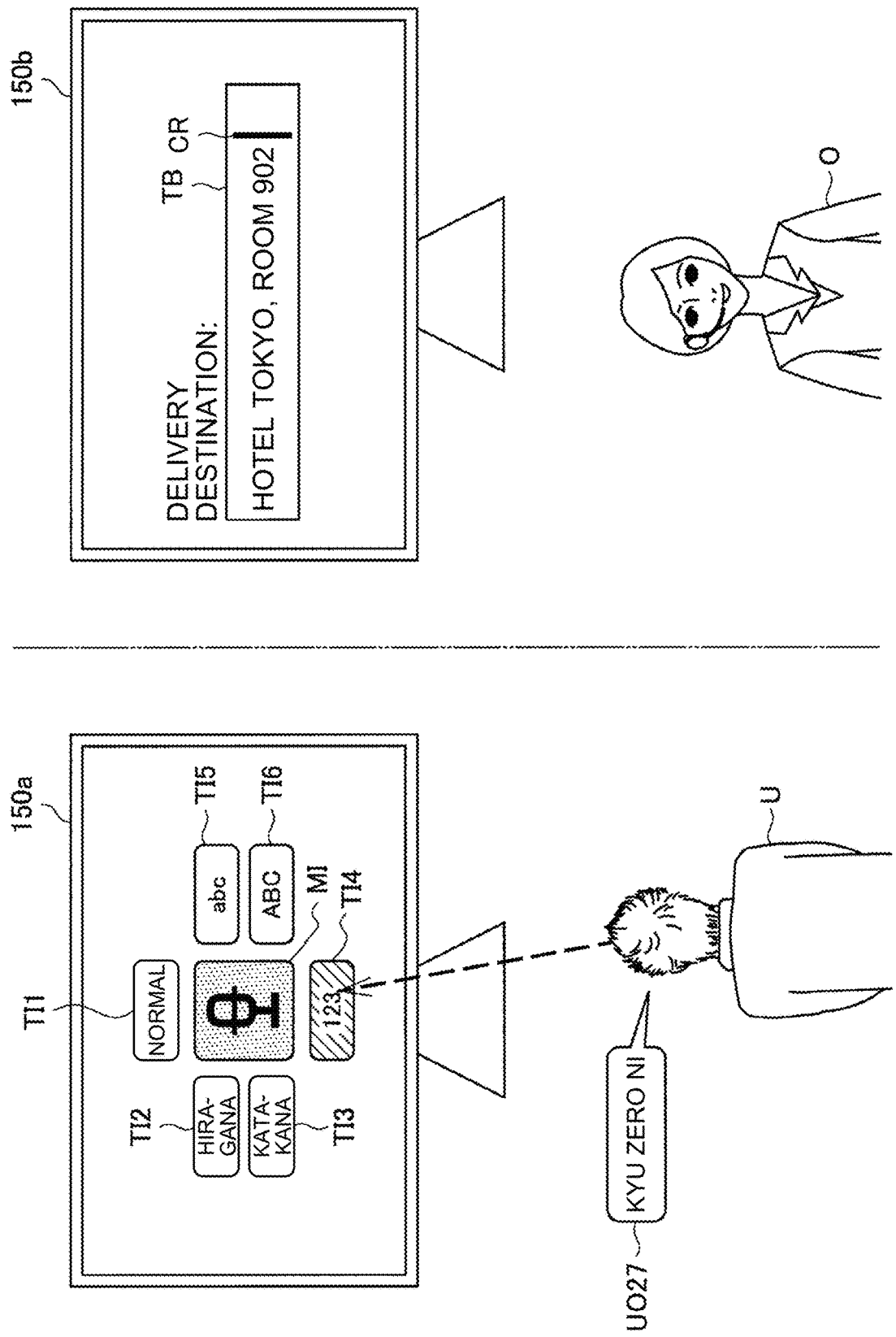
FIG. 29 is a diagram illustrating an example in a case in which a text box TB and a character representation icon TI according to the embodiment are output to different screens.

FIG. 29 is a diagram illustrating an example in a case in which the text box TB and the character representation icon TI are output to different screens. Here, it is assumed a situation in which the user U gives an address to an operator O in a call center by a telephone or the like.

At this time, the user U can designate the character representation to be applied to a speech UO27 by fixedly staring the character representation icon TI displayed on the display unit 150a in an information processing terminal 10a operated by the user. In the case illustrated in FIG. 29, the user U designates the text associated with the speech UO27 to apply the character type "Arabic numeric character" by fixedly staring the character representation icon TI.

In this case, the text associated with the speech UO27 given by the user U may be output, by using the character type "Arabic numeric character", to the text box TB displayed on a display unit 150b in an information processing terminal 10b operated by the operator O.

The control described above makes it possible to greatly reduce troublesomeness of orally conveying the character type and improve business efficiency of the operator.

1.6. Flow or Processes

Figure 30:
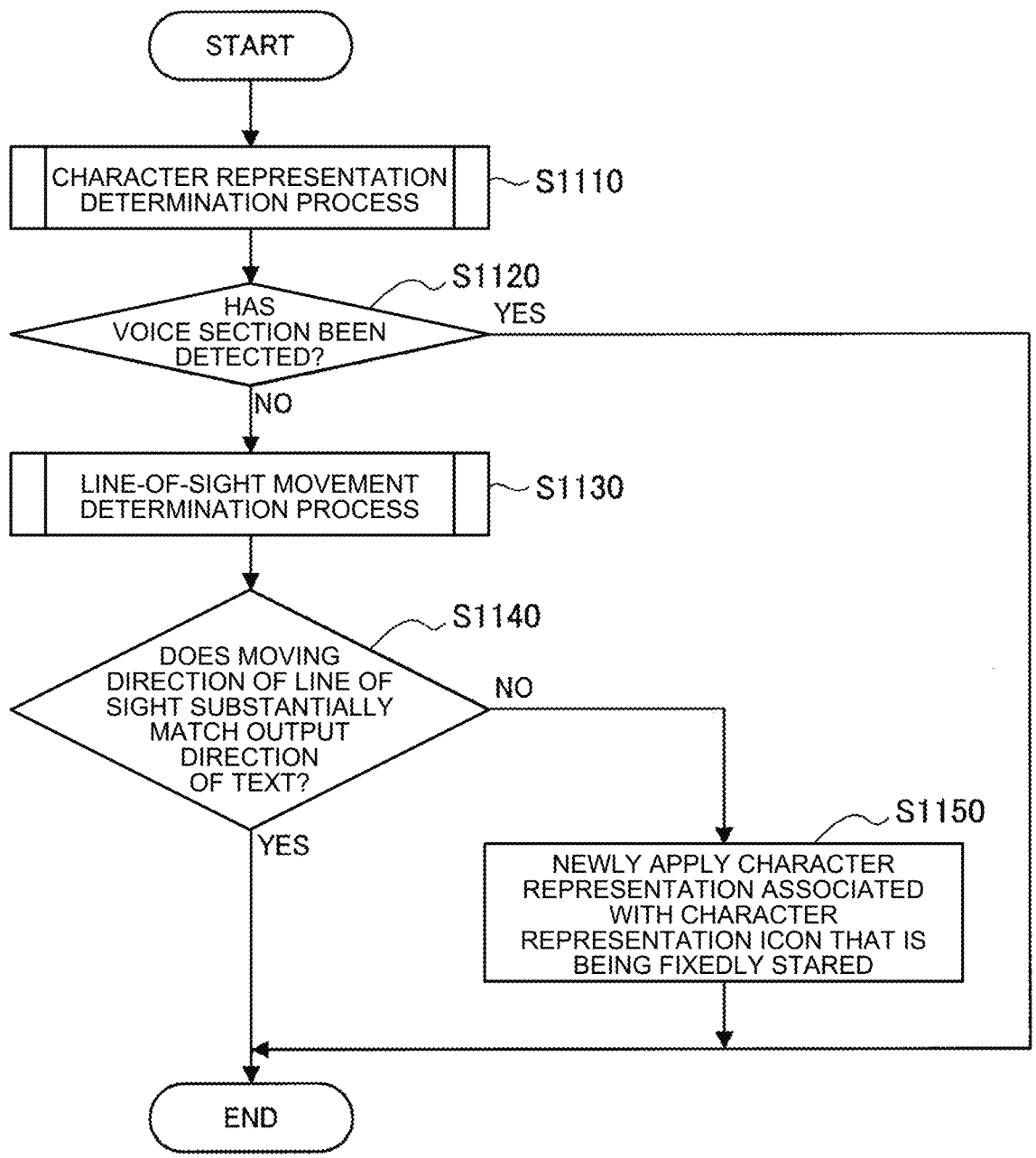
FIG. 30 is a flowchart illustrating the flow of applying of character representation performed by the information processing terminal 10 according to the embodiment.

In the following, the flow of the process performed by the information processing terminal 10 according to the embodiment will be described in detail. First, the flow of the process for applying the character representation performed by the information processing terminal 10 will be described. FIG. 30 is a flowchart illustrating the flow of the process of applying the character representation performed by the information processing terminal 10 according to the embodiment.

With reference to FIG. 30, first, the character representation deciding unit 135 performs a character representation determination process (S1110). Here, the character representation determination process mentioned here indicates a process for determining which character representation is designated by a non-verbal action performed by the user. The character representation determination process according to the embodiment will be separately described in detail later.

Then, the character representation deciding unit 135 according to the embodiment determines whether a voice section has been detected (S1120).

Here, when a voice section has been detected (YES at S1120), the character representation deciding unit 135 maintains the character representation applied by the character representation determination process performed at Step S1110.

In contrast, if a voice section has not been detected (NO at S1120), the character representation deciding unit 135 subsequently performs a line-of-sight movement determination process (S1130). Here, the line-of-sight movement determination process according to the embodiment mentioned here indicates a process for determining whether the moving direction of a line of sight substantially matches the output direction of the text. The line-of-sight movement determination process according to the embodiment will be separately described in detail later.

Here, if it is determined that the moving direction of the line of sight substantially matches the output direction of the text based on the line-of-sight movement direction determination performed at Step S1130 (YES at S1140), the character representation deciding unit 135 maintain the character representation applied by the character representation determination process performed at Step S1110.

In contrast, if it is determined that the moving direction of the line of sight does not substantially match the output direction of the text by line-of-sight movement based on the line-of-sight movement direction determination (NO at S1140), the character representation deciding unit 135 newly applies the character representation associated with the character representation icon that is fixedly being stared (S1150).

Figure 31:
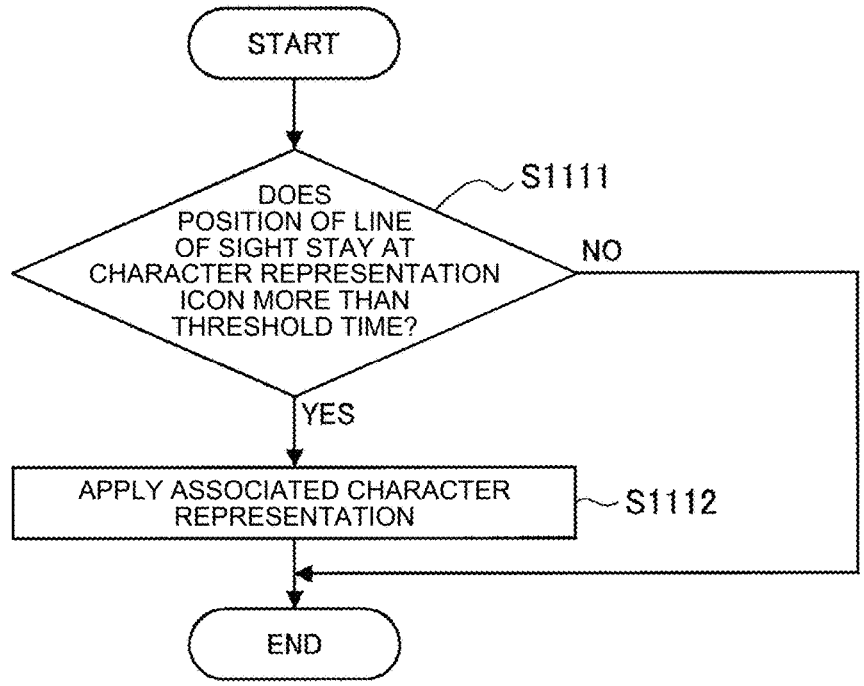
FIG. 31 is a flowchart illustrating a character representation determination process according to the embodiment.

In the above, the flow of the process for applying the character representation performed by the information processing terminal 10 has been described. Then, the flow of the character representation determination process to be performed at Step S1110 illustrated in FIG. 30 will be described in detail. FIG. 31 is a flowchart illustrating the flow of the character representation determination process according to the embodiment.

In the character representation determination process, first, the character representation deciding unit 135 determines whether the position of a line of sight of a user stays at the character representation icon TI more than the threshold (S1111).

Here, if it is determined that the position of a line of sight of a user does not stay at the character representation icon TI more than the threshold (NO at S1111), the character representation deciding unit 135 ends the character representation determination process.

In contrast, if it is determined that the position of a line of sight of a user stays at the character representation icon TI more than the threshold (YES at S1111), the character representation deciding unit 135 applies the character representation associated with the character representation icon TI in which the stay of the line of sight has been recognized (S1112).

In the above, the flow of the character representation determination process according to the embodiment has been described. In the following, the flow of the line-of-sight movement determination process to be performed at Step S1130 illustrated in FIG. 30 will be described in detail.

Figure 32:
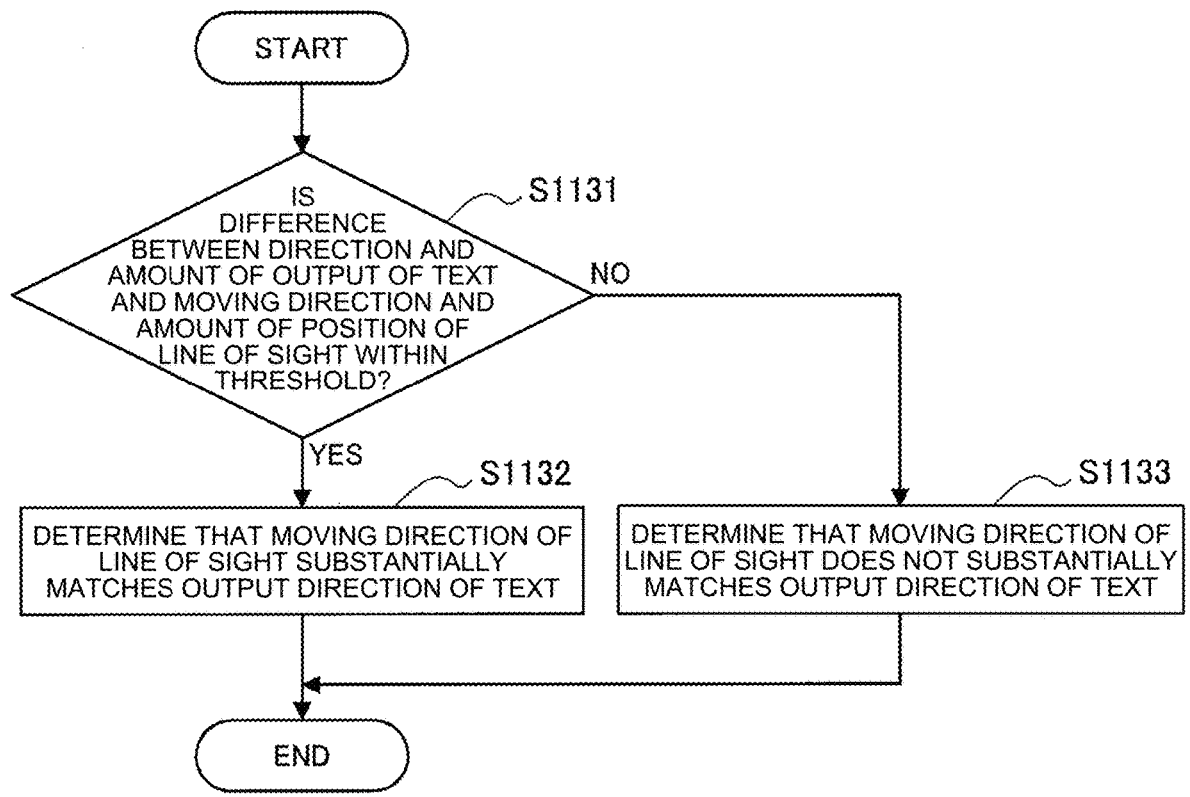
FIG. 32 is a flowchart illustrating a line-of-sight movement determination process according to the embodiment.

FIG. 32 is a flowchart illustrating the flow of the line-of-sight movement determination process according to the embodiment.

In the line-of-sight movement determination process, first, the character representation deciding unit 135 determines whether a difference between the direction and an amount of the output of a text and the moving direction and an amount of the position of a line of sight is within a threshold (S1131).

Here, if the difference described above is within the threshold (YES at S1131), the character representation deciding unit 135 determines that the moving direction of the line of sight substantially matches the output direction of the text (S1132).

In contrast, if the difference described above is greater than the threshold (NO at S1131), the character representation deciding unit 135 determines that the moving direction of the line of sight does not substantially match the output direction of the text (S1133).

Figure 33:
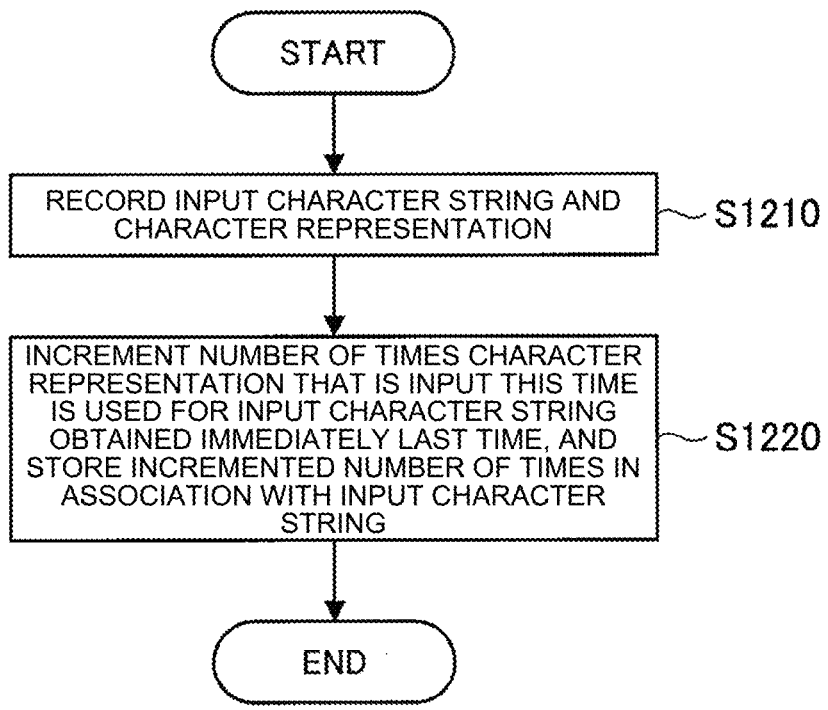
FIG. 33 is a flowchart illustrating an example of the flow of learning of character input tendencies performed by a character representation learning unit 145 according to the embodiment.

In the above, the flow of the line-of-sight movement determination process according to the embodiment has been described. In the following, an example of the flow of a process for learning a character input tendency performed by the character representation learning unit 145 according to the embodiment will be described. FIG. 33 is a flowchart illustrating an example of the flow of a process for learning the character input tendency performed by the character representation learning unit 145 according to the embodiment.

With reference to FIG. 33, first, the character representation learning unit 145 records the input character string and the character representation (S1210).

Then, the character representation learning unit 145 increments a number-of-times counter that counts the number of times the character representation that is input this time is used for the input character string obtained immediately before and stores the incremented number of times in association with the input character string (S1220).

Figure 34:
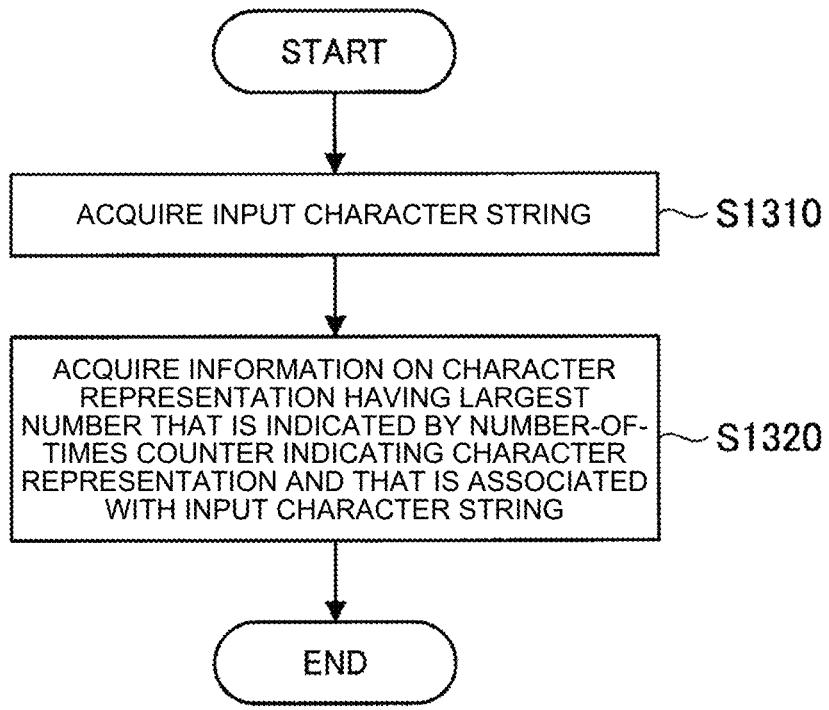
FIG. 34 is a flowchart illustrating an example of the flow of prediction of character representation performed by a character representation predicting unit 140 according to the embodiment.

In the above, the flow of the process for learning the character input tendency performed by the character representation learning unit 145 according to the embodiment has been described. In the following, an example of the flow of character representation prediction performed by the character representation predicting unit 140 according to the embodiment will be described. FIG. 34 is a flowchart illustrating the flow of the character representation prediction performed by the character representation predicting unit 140 according to the embodiment.

With reference to FIG. 34, first, the character representation predicting unit 140 acquires an input character string (S1310).

Then, the character representation predicting unit 140 acquires information on the character representation having the largest number indicated by the number-of-times counter that counts the number of times of character representation and that is associated with the input character string (S1320).

In the above, the flow of the character representation prediction performed by the character representation predicting unit 140 according to the embodiment has been described. Furthermore, the processes illustrated in FIG. 33 and FIG. 34 are only examples and learning of character input tendencies and prediction of the character representation according to the embodiment may also be implemented by a machine learning method by using, for example, neural networks, or the like.

2. Example of Hardware Configuration

Figure 35:
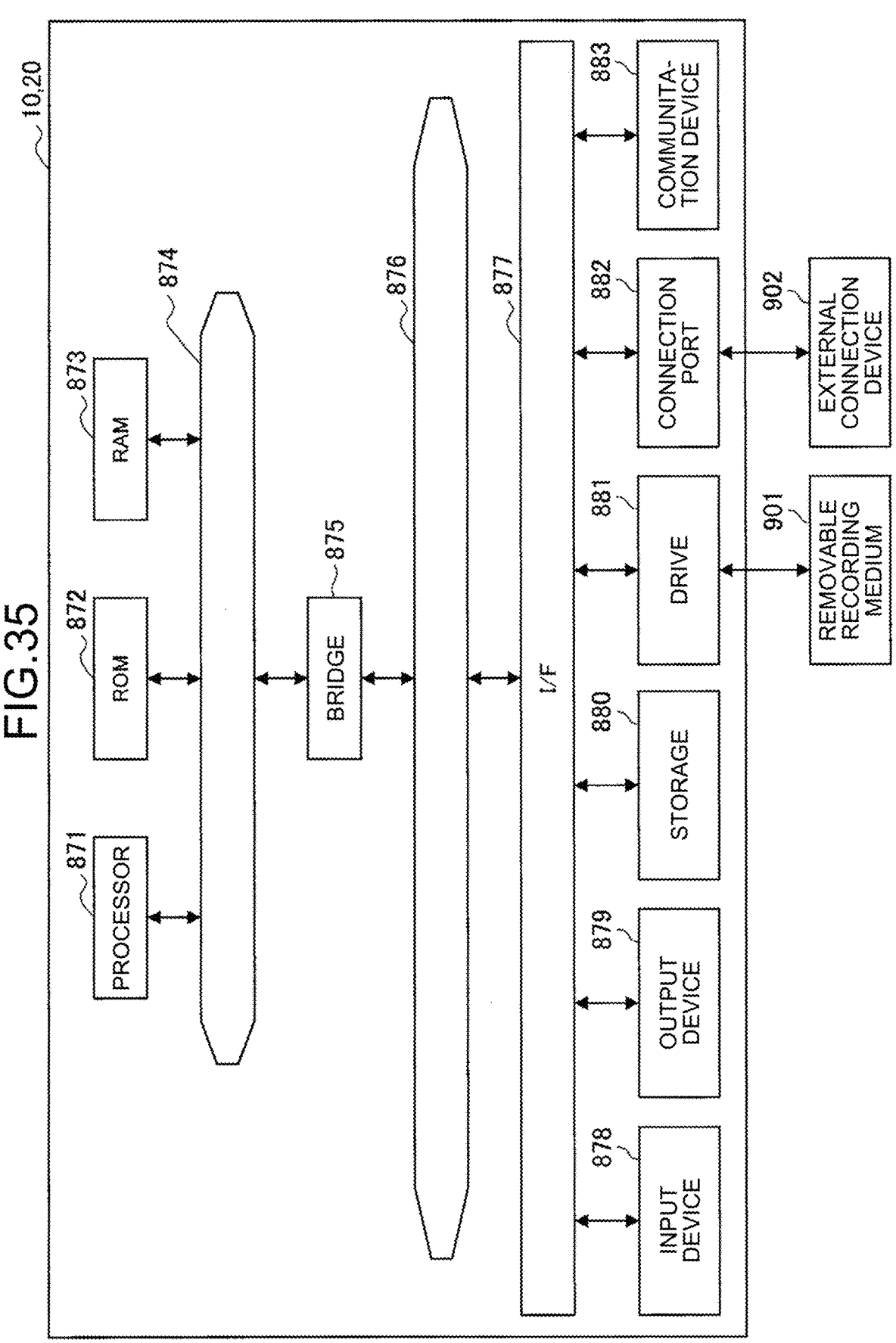
FIG. 35 is a diagram illustrating an example of a hardware configuration according to an embodiment of the present disclosure.

In the following, an example of hardware configuration common to the information processing terminal 10 and the information processing server 20 according to an embodiment of the present disclosure will be described. FIG. 35 is a block diagram illustrating the example of the hardware configuration of the information processing terminal 10 and the information processing server 20 according to an embodiment of the present disclosure. With reference to FIG. 35, each of the information processing terminal 10 and the information processing server 20 includes, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. Furthermore, the hardware configuration illustrated here is an example and some component may also be omitted. Furthermore, a component other than the components illustrated here may also be further included.

Processor 871

The processor 871 functions as, for example, an arithmetic processing device or a control device, and controls overall or part of the operation of each of the components based on various kinds of programs recorded in the ROM 872, the RAM 873, the storage 880, or a removable recording medium 901.

ROM 872 and RAM 873

The ROM 872 is a means for storing programs read by the processor 871, data used for calculations, and the like. The RAM 873 temporarily or permanently stores therein, for example, programs read by the processor 871, various parameters that are appropriately changed during execution of the programs, and the like.

Host Bus 874, Bridge 875, External Bus 876, and Interface 877

The processor 871, the ROM 872, and the RAM 873 are connected to one another via, for example, the host bus 874 capable of performing high-speed data transmission. In contrast, the host bus 874 is connected to the external bus 876 whose data transmission speed is relatively low via, for example, the bridge 875. Furthermore, the external bus 876 is connected to various components via the interface 877.

Input Device 878

As the input device 878, for example, a mouse, a keyboard, a touch panel, a button, a switch, a lever, or the like is used. Furthermore, as the input device 878, a remote controller (hereinafter, referred to as a controller) capable of transmitting control signals using infrared light or other radio waves may sometimes be used. Furthermore, the input device 878 includes a voice input device, such as a microphone.

Output Device 879

The output device 879 is, for example, a display device, such as a Cathode Ray Tube (CRT), an LCD, and an organic EL; an audio output device, such as a loudspeaker and a headphone; or a device, such as a printer, a mobile phone, or a facsimile, that is capable of visual or aurally notifying a user of acquired information. Furthermore, the output device 879 according to the present disclosure includes various vibration devices capable of outputting tactile stimulation.

Storage 880

The storage 880 is a device for storing various kinds of data. As the storage 880, for example, a magnetic storage device, such as a hard disk drive (HDD), a semiconductor storage device, an optical storage device, a magneto optical storage device, or the like may be used.

Drive 881

The drive 881 is a device that reads information recorded in the removable recording medium 901, such as a magnetic disk, an optical disk, a magneto-optic disk, or a semiconductor memory, or that writes information to the removable recording medium 901.

Removable Recording Medium 901

The removable recording medium 901 is, for example, various kinds of semiconductor storage media, such as a DVD medium, a Blu-ray (registered trademark) medium, or an HD DVD medium. Of course, the removable recording medium 901 may also be, for example, an IC card on which a contactless IC chip is mounted, an electronic device, or the like.

Connection Port 882

The connection port 882 is a port, such as a universal serial bus (USB) port, an IEEE 1394 port, a small computer system interface (SCSI), an RS-232C port, or an optical audio terminal, for connecting an external connection device 902.

External Connection Device 902

The external connection device 902 is, for example, a printer, a mobile music player, a digital camera, a digital video camera, an IC recorder, or the like.

Communication Device 883

The communication device 883 is a communication device for connecting to a network, and is, for example, a communication card for a wired or wireless LAN, Bluetooth (registered trademark), or wireless USB (WUSB); a router for optical communication or a router for asymmetric digital subscriber line (ADSL); a modem for various kinds of communication, or the like.

3. Conclusion

As described above, the information processing terminal 10 that implements the information processing method according to an embodiment of the present disclosure includes the character representation deciding unit 135 that decides the character representation related to speech-to-text conversion of the verbal action performed by the user. Furthermore, one of the features of the character representation deciding unit 135 according to an embodiment of the present disclosure is to decide, based on the detected non-verbal action performed by the above described user, the above described character representation for each detected verbal action section. With this configuration, it is possible to implement matched character string input intended by the user.

Although the preferred embodiments of the present disclosure has been described in detail above with reference to the accompanying drawings, the technical scope of the present disclosure is not limited to the examples. It is obvious that those having ordinary knowledge in the technical field of the present disclosure can derive modified examples or revised examples within the scope of the technical ideas described in the claims and it is understood that they, of course, belong to the technical scope of the present disclosure.

Furthermore, the effects described herein are only explanatory or exemplary and thus are not definitive. In other words, the technique according to the present disclosure can achieve, together with the effects described above or instead of the effects described above, other effects obvious to those skilled in the art from the description herein.

Furthermore, it is also possible to create programs for allowing the hardware of a computer including a CPU, a ROM, and a RAM to implement functions equivalent to those held by the information processing server 20 and it is also possible to provide a non-transitory computer readable recording medium in which the programs are recorded.

Furthermore, each of the steps related to the processes performed by the information processing terminal 10 in this specification does not always need to be processed in time series in accordance with the order described in the flowchart. For example, each of the steps related to the processes performed by the information processing terminal 10 may also be processed in a different order from that described in the flowchart or may also be processed in parallel.

Furthermore, the following configurations also belong to the technical scope of the present disclosure.

(1)

An information processing apparatus comprising a deciding unit that decides character representation related to speech-to-text conversion of a verbal action performed by a user, wherein the deciding unit decides the character representation for each detected verbal action section based on a detected non-verbal action performed by the user.

(2)

The information processing apparatus according to (1), wherein the verbal action includes at least a speech given by the user, and the deciding unit decides the character representation for each voice section based on the non-verbal action performed in accordance with the speech given by the user.

(3)

The information processing apparatus according to (2), wherein the non-verbal action includes at least an eye movement of the user, and the deciding unit decides, based on a line of sight of the user, the character representation for each of the voice sections.

(4)

The information processing apparatus according to (3), wherein the deciding unit applies the character representation associated with a character representation icon that has been fixedly stared by the user to the speech-to-text conversion in the subsequent voice section.

(5)

The information processing apparatus according to (4), wherein the deciding unit fixes the applying character representation until an end of the voice section is detected.

(6)

The information processing apparatus according to (4) or (5), wherein the deciding unit fixes the applying character representation when, in a case in which the voice section is not detected and an output of a text is not completed, an output direction of the text substantially matches a moving direction of the line of sight of the user.

(7)

The information processing apparatus according to any one of (3) to (5), wherein the deciding unit decides, based on the line of sight and the speech of each of a plurality of the users, the character representation related to the speech-to-text conversion of the speech for each of the users.

(8)

The information processing apparatus according to (7), wherein, when the speech given by any one of the users is detected, the deciding unit applies the character representation associated with a character representation icon that has been fixedly stared by the user who gave the speech to the speech-to-text conversion in the subsequent voice section and does not control the character representation based on a line of sight of another user.

(9)

The information processing apparatus according to (7), wherein the deciding unit simultaneously controls, based on the line of sight and the speech of each of the plurality of users, the character representation related to the speech-to-text conversion for each of the speeches given by the respective users.

(10)

The information processing apparatus according to (3), wherein, by using the character representation associated with a character representation icon that has been fixedly stared by the user after an end of each of the voice sections, the deciding unit converts a text associated with each of the voice sections.

(11)

The information processing apparatus according to any one of (1) to (10), wherein the character representation includes at least a character type.

(12)

The information processing apparatus according to any one of (1) to (11), wherein the character representation includes at least one of a typeface, a character decoration, a punctuation mark, and a notation language.

(13)

The information processing apparatus according to any one of (1) to (12), further comprising a predicting unit that predicts, based on a tendency of a character input performed by the user, the character representation related to the speech-to-text conversion of the verbal action performed by the user.

(14)

The information processing apparatus according to (13), wherein, when the user approves the character representation predicted by the predicting unit, the deciding unit applies the character representation to the speech-to-text conversion of a non-verbal action subsequent to the non-verbal action.

(15)

The information processing apparatus according to any one of (1) to (14), further comprising a display control unit that controls, by using the character representation decided by the deciding unit, display of a text based on recognition of the verbal action.

(16)

The information processing apparatus according to (15), wherein the display control unit controls display of a plurality of character representation icons associated with a respective plurality of pieces of the character representation selectable by the user.

(17)

The information processing apparatus according to (16), wherein the display control unit displays the plurality of character representation icons at a position in which a line-of-sight movement from an output position of the text based on the recognition of the verbal action is within a predetermined distance.

(18)

The information processing apparatus according to (2), wherein the non-verbal action includes at least a gesture made by the user, and the deciding unit decides the character representation for each of the voice sections based on the gesture made by the user.

(19)

The information processing apparatus according to (13) or (14), further comprising a learning unit that learns the tendency of the character input of the user.

(20)

An information processing method that causes a processor to execute a process comprising deciding character representation related to speech-to-text conversion of a verbal action performed by a user, wherein the deciding includes deciding the character representation for each detected verbal action section based on a detected non-verbal action performed by the user.

REFERENCE SIGNS LIST 10 information processing terminal
130 display control unit
135 character representation deciding unit
140 character representation predicting unit
145 character representation learning unit
20 information processing server 210 voice recognizing unit
220 voice section detecting unit
230 sound source direction presuming unit
240 speaker identifying unit
260 line-of-sight recognizing unit
270 gesture recognizing unit

The invention claimed is:

1. An information processing apparatus comprising:
circuitry configured to
   detect a verbal action performed by a user and verbal action sections based on the verbal action which is detected, the verbal action sections being sections in which the verbal action is performed;
   convert the verbal action to a text by speech-to-text conversion;
   detect a non-verbal action performed by the user; and
   decide character representation related to the speech-to-text conversion of the verbal action, the character representation being decided for each of the verbal action sections which are detected based on the non-verbal action, wherein
   the circuitry is further configured to predict the character representation to be decided for each of the verbal action sections based on a tendency of a character input by the user.

2. The information processing apparatus according to claim 1, wherein
   the verbal action includes at least a speech given by the user, and
   the circuitry is further configured to decide the character representation for each of voice sections based on the non-verbal action associated with the speech given by the user, the voice sections being sections in which the speech is given by the user.

3. The information processing apparatus according to claim 2, wherein
   the non-verbal action includes at least an eye movement of the user, and
   the circuitry is further configured to decide the character representation for each of the voice sections based on a line of sight of the user.

4. The information processing apparatus according to claim 3, wherein
   the circuitry is further configured to apply the character representation associated with a character representation icon that has been fixedly stared by the user, to the speech-to-text conversion in a subsequent voice section.

5. The information processing apparatus according to claim 4, wherein
   the circuitry is further configured to keep applying the character representation which is decided until an end of the subsequent voice section is detected.

6. The information processing apparatus according to claim 4, wherein
   the circuitry is further configured to keep applying the character representation which is decided when, in a case in which the subsequent voice section is not detected and an output of the text is not completed, an output direction of the text substantially matches a moving direction of the line of sight of the user.

7. The information processing apparatus according to claim 3, wherein
   the circuitry is further configured to decide, based on the line of sight and the speech of each of a plurality of users, the character representation related to the speech-to-text conversion of the speech for each of the plurality of users.

8. The information processing apparatus according to claim 7, wherein
   when the speech given by any one of the plurality of users is detected, the circuitry is further configured to apply the character representation associated with a character representation icon that has been fixedly stared by the user who gave the speech, to the speech-to-text conversion in a subsequent voice section and does not control the character representation based on a line of sight of another user.

9. The information processing apparatus according to claim 7, wherein
   the circuitry is further configured to simultaneously control, based on the line of sight and the speech of each of the plurality of users, the character representation related to the speech-to-text conversion for the speech given by each of the plurality of users.

10. The information processing apparatus according to claim 3, wherein
    the circuitry is further configured to apply the character representation associated with a character representation icon that has been fixedly stared by the user after an end of each of the voice sections, to the speech-to-text conversion in each of the voice sections.

11. The information processing apparatus according to claim 1, wherein
    the character representation includes at least a character type.

12. The information processing apparatus according to claim 1, wherein
    the character representation includes at least one of a typeface, a character decoration, a punctuation mark, and a notation language.

13. The information processing apparatus according to claim 1, wherein
    when the user approves the character representation which is predicted, the circuitry is further configured to apply the character representation which is approved to the speech-to-text conversion of a subsequent verbal action.

14. The information processing apparatus according to claim 1, wherein
    the circuitry is further configured to control display of the text based on recognition of the verbal action by using the character representation which is decided.

15. The information processing apparatus according to claim 14, wherein
    the circuitry is further configured to control display of a plurality of character representation icons associated with a plurality of types of the character representation selectable by the user.

16. The information processing apparatus according to claim 15, wherein
    the circuitry is further configured to control display of the plurality of character representation icons at a position which is located within a predetermined distance from an output position of the text based on the recognition of the verbal action.

17. The information processing apparatus according to claim 2, wherein
    the non-verbal action includes at least a gesture made by the user, and the circuitry is further configured to decide the character representation for each of the voice sections based on the gesture made by the user.

18. The information processing apparatus according to claim 1, wherein the circuitry is further configured to learn the tendency of the character input of the user.

19. An information processing method comprising:

detecting a verbal action performed by a user and verbal action sections based on the verbal action which is detected, the verbal action sections being sections in which the verbal action is performed;

converting the verbal action to a text by speech-to-text conversion;

detecting a non-verbal action performed by the user;

deciding character representation related to the speech-to-text conversion of the verbal action, the character representation being decided for each of the verbal action sections which are detected based on the non-verbal action; and predicting the character representation to be decided for each of the verbal action sections based on a tendency of a character input by the user.

\* \* \* \* \*